(12) United States Patent
Chiang

(10) Patent No.: US 10,664,477 B2
(45) Date of Patent: May 26, 2020

(54) CARDINALITY ESTIMATION IN DATABASES

(71) Applicant: Futurewei Technologies, Inc., Plano, TX (US)

(72) Inventor: Kuorong Chiang, Buena Park, CA (US)

(73) Assignee: Futurewei Technologies, Inc., Plana, TX (US)

( * ) Notice: Subject to any disclaimer, the term of this patent is extended or adjusted under 35 U.S.C. 154(b) by 214 days.

(21) Appl. No.: 15/850,361

(22) Filed: Dec. 21, 2017

(65) Prior Publication Data

US 2019/0197162 A1 Jun. 27, 2019

(51) Int. Cl.
- *G06F 17/30* (2006.01)
- *G06F 16/2453* (2019.01)
- *G06F 16/22* (2019.01)

(52) U.S. Cl.
CPC .... *G06F 16/24545* (2019.01); *G06F 16/2291* (2019.01)

(58) Field of Classification Search
CPC .................. G06F 16/24545; G06F 16/2291

USPC .................................................. 707/600–899
See application file for complete search history.

(56) References Cited

U.S. PATENT DOCUMENTS

| | | | |
|---|---|---|---|
| 7,478,083 B2 | 1/2009 | Corvinelli et al. | |
| 8,176,016 B1 | 5/2012 | Dai et al. | |
| 2004/0128287 A1 | 7/2004 | Keller et al. | |
| 2004/0193629 A1* | 9/2004 | Mozes | G06F 16/2462 |
| 2005/0131914 A1 | 6/2005 | Abdo et al. | |

* cited by examiner

*Primary Examiner* — Isaac M Woo

(74) *Attorney, Agent, or Firm* — Schwegman Lundberg & Woessner, P.A.

(57) ABSTRACT

A server applied to a database management system and a method are provided. By calculating a data skew for a column based on an entropy for the column in a database, storing the data skew to a catalogue in the database, estimating a selectivity for the column by multiplying a first selectivity with the data skew, cardinality estimation in the database management system is improved. By calculating a degree of correlation for two columns in a database, storing the degree of correlation to a catalogue in the database, estimating a selectivity taking into account the degree of correlation, cardinality estimation in the database management system is improved. The improved cardinality estimates in turn improve the query plan generated by the optimizer which leads to better query performance.

20 Claims, 13 Drawing Sheets

CARDINALITY ESTIMATION IN DATABASES

FIELD OF THE INVENTION

The present disclosure is related to databases, and in particular, to cardinality estimation in databases.

BACKGROUND

When a query statement such as an SQL (structured query language) query statement is received from a client by a database, steps such as syntax analysis, semantic analysis, and optimization need to be performed on the query statement, so as to generate an execution structure. An important component affecting execution efficiency of an SQL statement in a database management system (DBMS) is the optimizer which is configured to output a query plan during compilation. An executor performs a data operation according to the generated query plan.

Most optimizers nowadays are cost based. The query plan includes multiple steps where certain database operators are applied such as scanning a table (possibly filtering rows based on certain conditions at the same time), doing aggregation, and joining two tables, etc. The optimizer estimates a cost for each step based on an input (such as, estimated cardinality) to an operator and a cost model of the operator. The cost of the query plan is simply the sum of all the step costs. The optimizer searches the plan space, computes the cost for candidate plans, and picks the one with the lowest cost.

In a cost based optimizer, there are three major components: cardinality estimation (CE), cost model, and query plan search. And among them, the cardinality estimation is the most critical. It is also the hardest one to get right and the estimates can be off by orders of magnitude, resulting in sub-optimal plan.

SUMMARY

The present disclosure involves a database server in a database management system and a method for improving cardinality estimation in the database management system.

In some instances, one aspect of the subject matter described here may be a server applied to a database management system including a non-transitory memory storage comprising instructions, and one or more processors in communication with the memory. The one or more processors executes the instructions to: calculate a data skew for a first column based on an entropy for the first column in a database, wherein the first column includes a plurality of distinct values; store the data skew to a catalogue in the database; estimate a selectivity for the first column by multiplying a first selectivity with the data skew; and generate a query plan based on the estimated selectivity.

In some instances, the one or more processors further executes the instructions to: calculate a joint entropy for the first column and a second column in the database; calculate mutual information I based on the entropy for the first column, an entropy for the second column, and the joint entropy; calculate a degree of correlation c between the first and second columns based on the mutual information, where $c=2^I$; and store the degree of correlation in the catalogue.

In some instances, the one or more processors further executes the instructions to: estimate a joint selectivity between the first and second columns by multiplying the selectivity for the first column, a selectivity for the second column, and the degree of correlation; and generate the query plan based on the estimated joint selectivity.

In some instances, the one or more processors further executes the instructions to: calculate a number of surviving values of the first column given a condition on the second column, according to the degree of correlation and a number of distinct values of the second column; and use the number of surviving values of the first column for join cardinality estimation. Further, if the number of distinct values of the second column is 1, the one or more processors executes the instructions to: calculate the number of surviving values of the first column by dividing a first number of pseudo values of the first column with the degree of correlation, wherein the first column has entropy H and the first number of pseudo values of the first column is $2^H$. If j represents the number of distinct values of the second column, $v1(x)$ represents a first number of pseudo values of the first column, and c represents the degree of correlation, wherein the one or more processors executes the instructions to: calculate the number of surviving values of the first column $v(x)$ as:

$$v(x) = v1(x) * \left(1 - \left(1 - \frac{1}{c}\right)^j\right).$$

In some instances, the one or more processors further executes the instructions to: calculate a number of combined values of the first column and the second column by dividing a product of a number of pseudo values of the first column and a number of pseudo values of the second column with the degree of correlation; and use the number of combined value for aggregation cardinality estimation.

In some instances, the one or more processors further executes the instructions to: calculate a number of combined values of the first column and the second column by dividing a product of a number of pseudo values of the first column and a number of pseudo values of the second column with the degree of correlation; and use the number of the combined values for join cardinality estimation.

In some instances, one aspect of the subject matter described here may be a server applied to a database management system including a non-transitory memory storage comprising instructions, and one or more processors in communication with the memory. The one or more processors executes the instructions to: calculate a node level entropy; calculate a node level skew based on the node level entropy; determine whether a redistribution cost is available; and multiply the redistribution cost with the node level skew for cost estimation.

In some instances, one aspect of the subject matter described here may be implemented as a method performed by a server applied to a database management system. The method includes the following steps: calculating a data skew for a first column based on an entropy for the first column in a database, wherein the first column includes a plurality of distinct values; storing the data skew to a catalogue in the database; estimating a selectivity for the first column by multiplying a first selectivity with the data skew; and generating a query plan based on the estimated selectivity.

By calculating the data skew and correlation based on entropy and estimating the selectivity by considering the data skew and correlation, cardinality estimation in the database management system is improved. The improved cardinality estimates in turn improve the query plan leading to better query performance.

BRIEF DESCRIPTION OF THE DRAWINGS

Like reference numbers and designations in the various drawings indicate like elements.

DETAILED DESCRIPTION

The making and using of the presently example embodiments are discussed in detail below.

Cardinality estimation (CE) can be understood as below. A column in a database table is essentially a probability distribution. The X axis represents the values of the column and the Y axis represents the probability of the values. In database, probability, may be called as selectivity, means the percentage of the selected database table rows satisfying a certain condition, e.g., having a particular value. The conventional approach to cardinality estimation is to use a histogram to summarize the data. Given a value on a database table column, the corresponding histogram is searched to find a bucket containing the value, and then the average selectivity of the bucket is used as the selectivity estimation. By way of illustration, if the bucket contains N distinct values, 1/N is the estimated selectivity, meaning each value has the same selectivity within the bucket. The accuracy of this approach depends on the granularity of the histogram, i.e., the number of buckets. Obviously the more buckets, the more accurate the selectivity estimates. Practically, however, the memory usage of the histogram needs to be controlled. So most databases use a fixed number of buckets, e.g., 200. For a very large column, each bucket may cover a very large number of rows which have their own selectivity distribution. The 1/N selectivity in this conventional approach may not be accurate. The inaccuracy is especially severe if the distribution is highly skewed.

For multiple columns, the conventional approach is to estimate an individual selectivity for each column then multiply the selectivities together. This conventional approach assumes no correlation between the columns, i.e., the columns are independent. However most data has some degree of correlation so the conventional approach tends to under-estimate joint selectivity.

Therefore, determining CE is difficult mainly because of data skew and the degree of correlation. Conventional approaches assume no skew in data distribution and no correlation between columns. A database server and a method, by defining skew and the degree of correlation based on entropy and by developing algorithms to compute and use skew and the degree of correlation, for improving cardinality estimation in the database management system are described.

Figure 1:
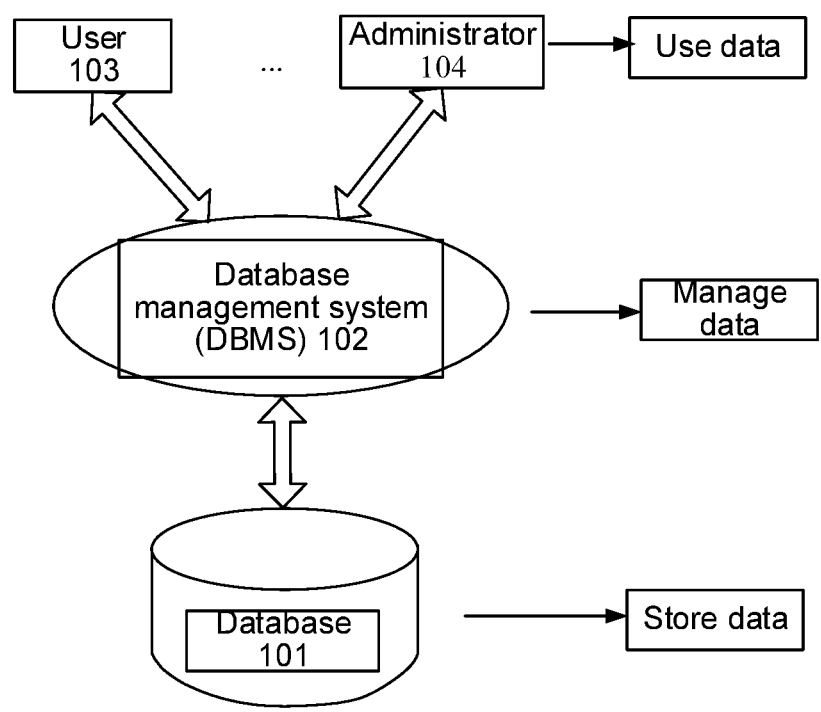
FIG. 1 is a schematic architectural diagram of a database system according to an embodiment.

An architecture of a database system applied to embodiments of the present invention is shown in FIG. 1. The database system includes a database 101 and a database management system (DBMS) 102.

The database 101 is an organized data set stored in a data store, that is, an associated data set that is organized, stored, and used according to a particular data model. For example, the database 101 may include one or more pieces of table data.

The DBMS 102 is configured to set up, use, and maintain the database 101, and manage and control the database 101, so as to ensure security and integrity of the database 101. A user 103 may access data in the database 101 by using the DBMS 102, and a database administrator 104 also maintains the database by using the DBMS 102. The DBMS 102 provides various functions, so that multiple application programs and user equipment can set up, modify, and query the database by using different methods at the same moment or at different moments. The application program and the user equipment may be collectively referred to as a client. The functions provided by the DBMS 102 may include the following items: (1) a data definition function: the DBMS 102 provides a data definition language (DDL) to define a database structure, and the DDL is used to characterize a database schema and can be stored in a data dictionary; (2) a data access function: the DBMS 102 provides a data manipulation language (DML), to implement basic access operations such as retrieval, insertion, update, and deletion on data in the database; (3) a database operation management function: the DBMS 102 provides a data control function, that is, control of security, integrity, concurrency, and the like of data to effectively control and manage operation of the database, so as to ensure data correctness and validity; (4) a database setup and maintenance function, including loading of initial data in the database and functions such as dumping, recovery, re-organizing, system performance monitoring, and analysis of the database; and (5) database transmission: the DBMS 102 provides transmission of processed data, to implement communication between the client and the DBMS 102, and the database transmission may be completed by cooperating with an operating system.

The DBMS 102 may be applied to a single-server database system, a cluster database system of a shared-nothing architecture, a cluster database system of a shared-storage architecture, or a database system of another type. The data store of the DBMS 102 includes, but is not limited to, a solid-state drive (SSD), a disk array, or a non-transient computer readable medium of another type.

Figure 2:
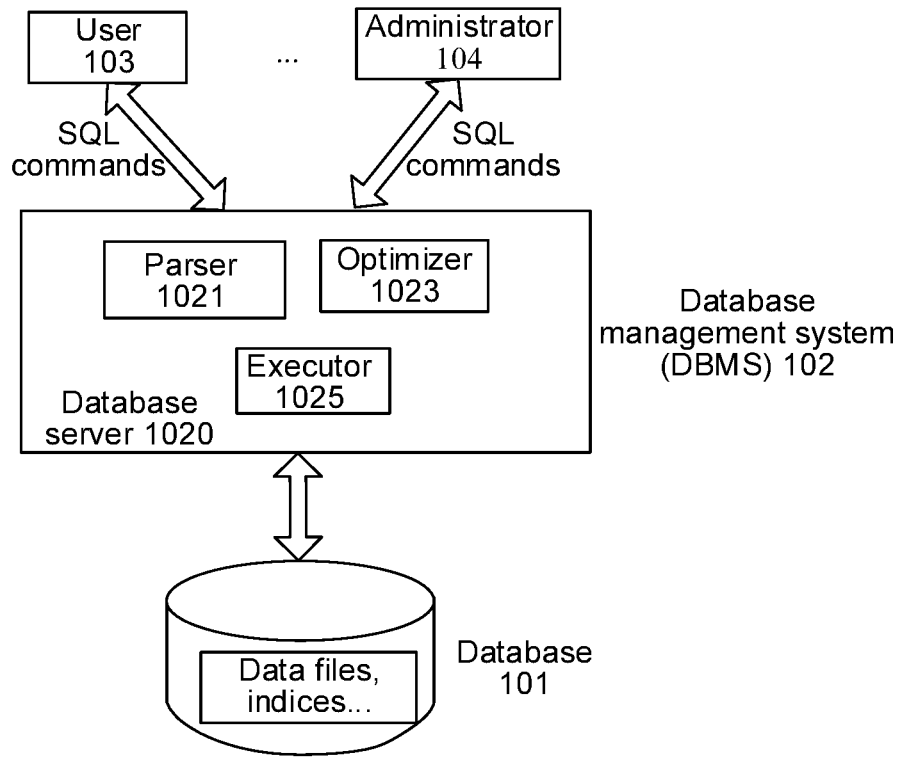
FIG. 2 is a schematic architectural diagram of a database system according to another embodiment.

Another architecture of a database system applied to embodiments of the present invention is shown in FIG. 2. The DBMS 102 may be located in a database server 1020. Specifically, as shown in FIG. 2, the database server 1020 may include a parser 1021, an optimizer 1023, and an executor 1025. When a client queries the database 101 via SQL commands, a client query is first analyzed by the parser 1021, and then mapped into a sequence of operations to be implemented by the executor 1025. The optimizer 1023 is a planner module that employs different techniques (such as plan representation, search including directed search and pruning, dynamic programming, etc.) to enhance the performance of the query processing by minimizing several variables, such as the response time, I/O, memory costs, and a total resource usage. In the embodiments described below, the optimizer 1023 will consider skew and the degree of correlation based on entropy, to improve CE. The optimizer 1023 generates a query plan, for example, a tree structure. The executor 1025 executes the query plan. The query plan can be operated directly on the stored database objects in database 101. The database 101 may include data files, indices, etc.

This disclosure defines skew and the degree of correlation based on entropy, and develops algorithms to calculate and use the skew and the degree of correlation to improve CE. Entropy for a column is defined as:

$$H = -\Sigma_{i-1}^n p_i \log p_i \quad \text{Eq(1)}$$

where log is of base 2 (this holds for the entire disclosure for ease of description), $p_i$ represents selectivity of the $i^{th}$ value in the column, and n represents total distinct values of the column.

For two columns X and Y, joint entropy is defined as:

$$H(x,y) = -\Sigma_{x,y} p_{(x,y)} \times \log p_{(x,y)} \quad \text{Eq (2)}$$

where p(x,y) is the joint selectivity function of X and Y.

For two columns X and Y, the mutual information is defined as:

$$I(x,y) = H(x) + H(y) - H(x,y) \quad \text{Eq(3)}$$

Figure 3:
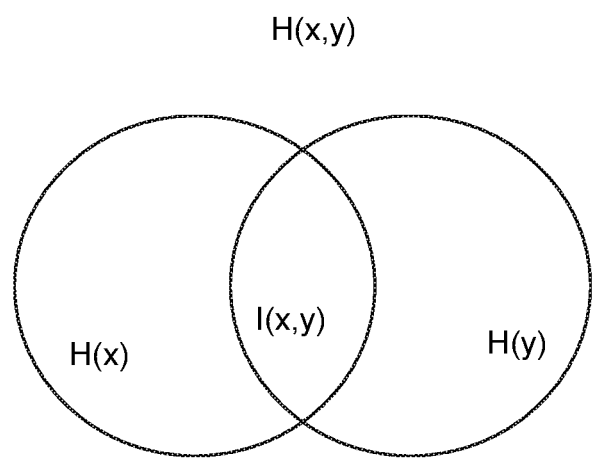
FIG. 3 is a block diagram illustrating example entropies, joint entropy, and mutual information.

FIG. 3 illustrates the relationship between H(x), H(y), H(x, y) and I(x,y).

Kullback-Leibler (KL) divergence (aka relative entropy) measures the difference between two distributions. If P represents a real distribution and Q represents an estimate of P, the Kullback-Leibler divergence (relative entropy) between two distributions P and Q is:

$$D_{KL}(P\|Q) = \sum_i p_i \times \log \frac{p_i}{q_i} \quad \text{Eq (4)}$$

where $p_i$ represents distinct value of P, and $q_i$ represents distinct value of Q. Relative entropy can be viewed as an error measure of the estimate Q. The smaller the relative entropy, the more accurate the estimate Q.

Based on Eq(4) and Eq(1), the error for the conventional single column selectivity estimate 1/n is:

$$D_{KL}\left(P\|\frac{1}{n}\right) = \quad \text{Eq (5)}$$

$$\sum_i p_i \times \log \frac{p_i}{\frac{1}{n}} = \sum_i p_i \times \log n + \sum_i p_i \times \log p_i = \log n - H$$

Let $\Delta H = \log n - H$, $\Delta H = 0$ when the distribution is uniform because for uniform distribution, $H = \log n$. When the distribution is not uniform, $\Delta H > 0$ because log n is the maximum entropy for any distributions with n values. The higher the skew, the lower the entropy H. Therefore, the higher the skew, the higher the error of the estimate 1/n.

For an estimate s, the DL divergence is $$D_{KL}(P\|s) = \quad \text{Eq (6)}$$

$$\sum_i p_i \times \log \frac{p_i}{s} = \sum_i p_i \times \log p_i + \sum_i p_i \times \log \frac{1}{s} = \log \frac{1}{s} - H$$

The above $D_{KL}(P\|s)$ is 0 when $s = 2^{-H}$. By replacing the conventional estimate 1/n with $s = 2^{-H}$, skew is taken into consideration in selectivity estimation. When there is no skew, $$s = \frac{1}{n}.$$

Formally, selectivity s can be defined for a column having entropy H as:

$$s = 2^{-H} \quad \text{Eq(7)}$$

For example, in a table named as Lineitem, the Lineitem table includes three columns l_shipdate, l_commitdate and l_receiptdate. Based on Eq(1), the entropy for column l_shipdate is calculated as 11.2687, the entropy for column l_commitdate is calculated as 11.2507, and the entropy for column l_receiptdate is calculated as 11.2704.

Based on Eq(7), selectivity s for column l_shipdate is calculated as:

$$s(\text{l\_shipdate}) = 2^{-H(\text{l\_shipdate})} = 2^{-11.2687} = 4.0531e\text{-}004$$

Based on Eq(7), selectivity s for column l_commitdate is calculated as:

$$s(\text{l\_commitdate}) = 2^{-H(\text{l\_commitdate})} = 2^{-11.2507} = 4.1039e\text{-}004$$

Based on Eq(7), selectivity s for column l_receiptdate is calculated as:

$$s(\text{l\_receiptdate}) = 2^{-H(\text{l\_receiptdate})} = 2^{-11.2704} = 4.0483e\text{-}004$$

Pseudo value v can be defined as:

$$v = \frac{1}{s} = 2^H \quad \text{Eq (8)}$$

The pseudo value v as $2^H$ replaces conventional distinct value n. Conceptually, a skewed distribution is "flattened out" to a uniform one with the distinct values reduced from n to v. That is, a skewed distribution can be treated as if it is uniform with a reduced distinct values v. This is convenient as DBMS codes assume uniform distribution for all columns. As long as n is replaced with v, the codes need not be changed in order to take skew into account when estimating selectivity. Note that for uniform distribution, v=n.

Skew k can be defined as $$k = 2^{\log n - H} = 2^{\Delta H} \quad \text{Eq(9)}$$

Therefore, the selectivity s, which replaces conventional $1/n$, is $$s = 2^{-H} = (1/n) * k \qquad \text{Eq(10)}$$

That is, k is the factor to increase the selectivity from $1/n$ due to the skew.

Correlation can be understood as the factor to adjust the joint selectivity, and c represents the degree of correlation. Based on Eq(4), Eq (1) and Eq(2), the error of the joint selectivity estimate is:

$$D_{KL}(P(x, y) \| P(x)P(y)c) = \qquad \text{Eq (11)}$$

$$\sum_{x,y} p_{(x,y)} \times \log \frac{p_{(x,y)}}{p_{(x)} p_{(y)} c} = \sum_{x,y} p_{(x,y)} \times \log p_{(x,y)} -$$

$$\sum_{x,y} p_{(x,y)} \times \log p_x - \sum_{x,y} p_{(x,y)} \times \log p_y - \sum_{x,y} p_{(x,y)} \times \log c =$$

$$\sum_{x,y} p_{(x,y)} \times \log p_{(x,y)} - \sum_{x} p_{(x)} \times \log p_x - \sum_{y} p_{(y)} \times \log p_y -$$

$$\log c = -H(x, y) + H(x) + H(y) - \log c$$

Based on Eq(11) and Eq(3):

$$D_{KL}(P(x,y) \| P(x)P(y)c) = I(x,y) - \log c \qquad \text{Eq(12)}$$

If $c=1$, $D_{KL}(P(x,y)\|P(x)P(y)c)=I(x,y)$. That is, the conventional approach with $c=1$ has the selectivity estimation error of $I(x,y)$. If two columns X and Y are independent, the error of the joint selectivity estimate is 0. If two columns X and Y are not independent, the error of the joint selectivity estimate is $I(x,y)$ which is greater than 0. The higher the correlation between the columns X and Y, the higher the mutual information $I(x,y)$. Therefore, the higher the correlation, the higher the error of the joint selectivity estimation.

In most situations, two columns X and Y are not independent. When two columns X and Y are dependent, in order to ensure that the error of the joint selectivity estimate is 0, based on Eq(11) and Eq(3):

$$\log c = H(x) + H(y) - H(x,y) = I(x,y) \qquad \text{Eq(13)}$$

Therefore, a degree of correlation c between two columns X and Y is:

$$c = 2^{I(x,y)} \qquad \text{Eq(14)}$$

$c >= 1$ because $I(x,y) >= 0$. Conventional approach assumes $c=1$.

Correlation is critical in joint cardinality estimation. Due to lack of a good correlation model, many DBMS (including Huawei's) simply ignore correlation in the conventional method. The result is a huge under-estimation for the joint cardinality. Correlation can be used to improve cardinality estimation when there are multiple correlated columns used in various database operations. FIG. 8 through FIG. 11 explains how this is done.

For example, in the table named as Lineitem, based on Eq(14), a degree of correlation c between two columns 1_shipdate and 1_commitdate is as:

$$c(s\_c) = 2^{I(1\_shipdate, 1\_commitdate)} = 2^{(H(x)+H(y)-H(x,y))} = 2^{11.2687+11.2507-18.5245} = 15.94.$$

Based on Eq(14), correction c between two columns 1_shipdate and 1_receiptdate is as:

$$c(s\_r) = 2^{I(1\_shipdate, 1\_receiptdate)} = 2^{(H(x)+H(y)-H(x,y))} = 2^{11.2687+11.2704-16.1747} = 82.39.$$

Then, based on Eq(14), joint selectivity $s(x,y)$, which replaces conventional $s(x)*s(y)$ as:

$$s(x,y) = s(x) * s(y) * c \qquad \text{Eq(15)}$$

For example, in the table named as Lineitem, based on Eq(15), joint selectivity s between two columns 1_shipdate and 1_commitdate is as:

$$s(s\_c) = s(1\_shipdate) * s(1\_commitdate) * c(s\_c) = (4.0531e-004) * (4.1039e-004) * 15.94 = 2.6514e-006.$$

Based on Eq(15), joint selectivity s between two columns 1_shipdate and 1_receiptdate is as:

$$s(s\_c) = s(1\_shipdate) * s(1\_receiptdate) * c(s\_r) = (4.0531e-004) * (4.0483e-004) * 82.39 = 1.3519e-005.$$

The error rates for the above estimates, which consider the degree of correlation between 1_shipdate and 1_commitdate and between 1_shipdate and 1_receiptdate, are shown in table 1:

TABLE 1

| Predicate | S(x) | S(y) | Real S(x,y) | Estimated s(x,y) | error |
| --- | --- | --- | --- | --- | --- |
| L_shipdate = '1992-05-22 00:00:00' and L_commitdate = '1992-05-19 00:00:00'; | 0.000418 | 0.000414 | 4.48438E−06 | 2.6514E−06 | 41% |
| L_shipdate = '1994-08-23 00:00:00' and L_receiptdate = '1994-09-18 00:00:00'; | 0.000418 | 0.000417 | 1.61371E−05 | 1.3519E−05 | 16% |

The error rates for the traditional estimates, which does not consider the degree of correlation between 1_shipdate and 1_commitdate and between 1_shipdate and 1_receiptdate, are shown in table 2:

TABLE 2

| Predicate | S(x) | S(y) | Real S(x,y) | Estimated s(x,y) | error |
| --- | --- | --- | --- | --- | --- |
| L_shipdate = '1992-05-22 00:00:00' and L_commitdate = '1992-05-19 00:00:00'; | 0.000418 | 0.000414 | 4.48438E−06 | 1.50035E−07 | 97% |

TABLE 2-continued

| Predicate | S(x) | S(y) | Real S(x,y) | Estimated s(x,y) | error |
|---|---|---|---|---|---|
| L_shipdate = '1994-08-23 00:00:00' and L_receiptdate = '1994-09-18 00:00:00'; | 0.000418 | 0.000417 | 1.61371E−05 | 1.50035E−07 | 99% |

Comparing table 1 to table 2, the error rates of traditional approach are much higher than the new joint selectivity estimation. The new joint selectivity estimation, by considering the degree of correlation, is able to improve the accuracy of estimation.

Correspondingly, joint pseudo value can be defined as:

$$v(x, y) = \frac{1}{s(x, y)} = \frac{v(x) * v(y)}{c} \quad \text{Eq (16)}$$

If X functionally determines Y, H(x,y)=H(x), I(x,y)=H(y). In this scenario, based on Eq (14), $c=2^{I(x,y)}=2^{H(y)}=1/s(y)$. Therefore, based on Eq (15), s(x,y)=s(x).

For example, there is a table named date_dim. The table date_dim includes two columns d_date and d_year. Column d_date functionally determines Column d_year. Based on Eq(1), the entropy for column d_date is calculated as 16.157, and the entropy for column d_year is calculated as 7.644. Based on Eq(2), joint entropy between d_date and d_year is calculated as 16.157. Based on Eq(3), mutual information between d_date and d_year is calculated as 7.644. Based on Eq(14), a degree of correlation c between d_date and d_year is as:

$$c(d\_y) = 2^{7.644} \approx 200$$

The database servers can estimate the "surviving values" (i.e., remaining values) on a join column given a selection condition on a correlated column. For example, if X is the join column and there is a selection condition on Y (e.g., Y=2001), then Eq (16) can be used to estimate the surviving values (i.e., remaining values) of X:

$$v(x, y = 2001) = \frac{v(x) * v(y = 2001)}{c} = \frac{v(x)}{c}.$$

A more general surviving value formula can be derived as follows using a probabilistic interpretation of the degree of correlation: 1/c=probability of an X value "seen by" (i.e., paired to) a Y value. When c=1, all X, Y value pairs exist.

The probability (p) of a particular X value x1 not seen by a Y value is 1−1/c.

For j Y values, p(x1 not seen by any y value)=$(1-1/c)^j$, therefore, p(x1 is seen by at least one y value)=$1-(1-1/c)^j$, and the total X values (surviving values) seen by j Y values are $v(x)*(1-(1-1/c)^j)$. For j=1, surviving X values=v(x)/c as expected.

The two tables' example explains how to improve the accuracy of the join cardinality estimation based on the degree of correlation c between d_date and d_year. One table of the two tables is named as store_sales, and another table is named as date_dim. The store_sales table includes a column named as ss_sold_date_sk. The date_dim includes a column named as d_date, and another column named as d_year. PK-FK (Prime Key-Foreign Key) join value between store_sales and date_dim is to be calculated for d_year=2001. For example, the column ss_sold_date_sk has 1823 values, the column d_date has 73000 values (almost 200 years). By using c(d_y)=200, values of d_date is reduced to 73000/c=73000/200=365 as expected for d_year=2001. By considering the degree of correlation c between d_date and d_year, 365 values are used instead of 73000 values for d_date in join cardinality estimation. Therefore, the accuracy of the join cardinality estimation is improved: in an example, selectivity of store_sales is improved from 0.5% to 20% (much accurate), resulting in a much better plan.

Figure 4:
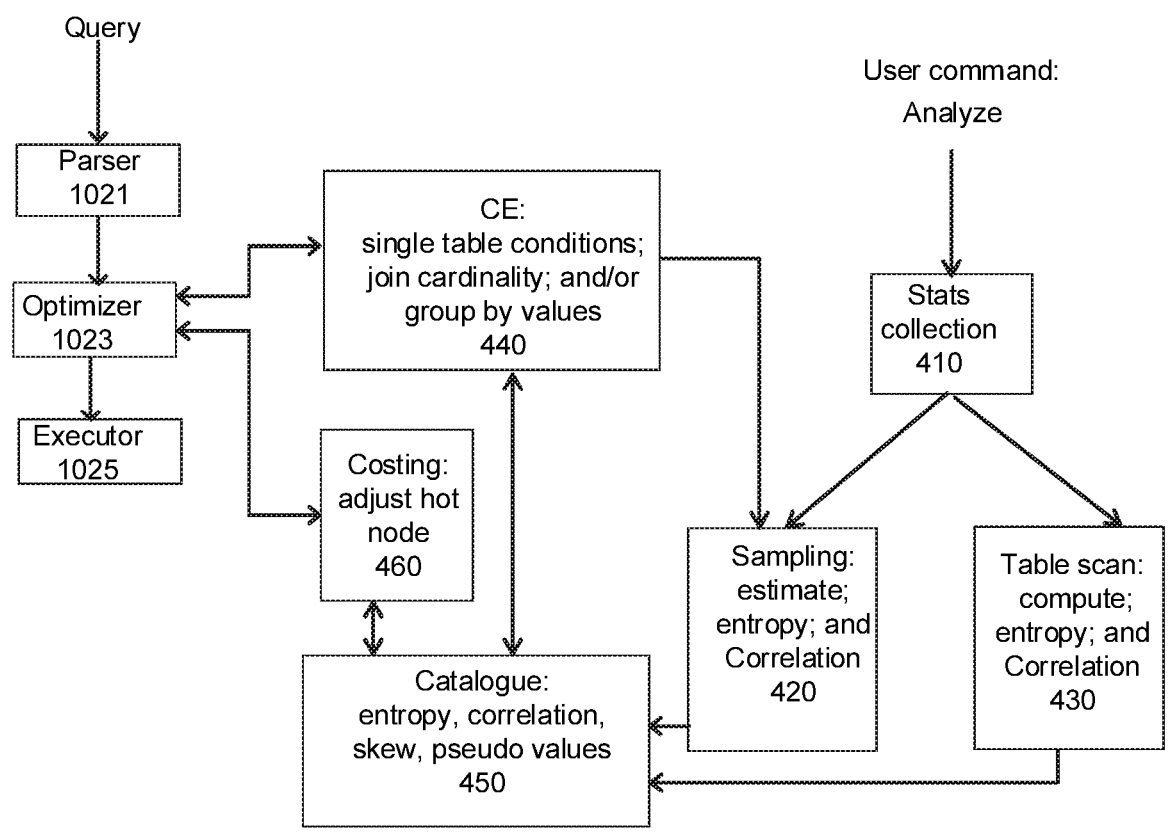
FIG. 4 is a schematic diagram of performing an information processing method by a database management system according to an embodiment.

FIG. 4 is a schematic diagram of performing an information processing method by a database management system according to an embodiment. After user command for collecting statistics (such as Analyze on PostgreSQL database) is entered, the database server, which includes optimizer 1023, collects statistics at block 410. In an approach, the server can do table scan at block 430. The server does an aggregation on the column and gets the counts for all the values $c_i$. It also gets the total values n and the total counts t, and the selectivities for all values are $$p_i = \frac{c_i}{t}.$$

It then uses Eq(1) to compute entropy, Eq(2), Eq (3) and Eq(14) to compute a degree of correlation. Skew is computed using Eq(9) and pseudo values are computed using Eq(8). The computed entropy, the degree of correlation, skew, and the number of the pseudo values are stored in the catalogue tables. Note that statistics collection is time consuming and resource intensive so it is generally run when the system is relatively idle. At runtime, the optimizer will retrieve from the catalogue the entropy related information and use them for cardinality estimation. In another approach, the server can do sampling at block 420 and uses the samples to estimate the entropy and the degree of correlation, etc., and store them in the catalogue. The detailed processes for using the samples to estimate entropy and a degree of correlation are described in FIG. 5 and FIG. 6. After performing block 420 or block 430, the server may store catalogue data, such as entropy, the degree of correlation, skew, and/or the number of the pseudo values at block 450. Therefore, when the server performs cardinality estimation (CE) at block 440, the server can use the catalogue data. The CE includes but not limited to single table conditions, join cardinality, and/or group by values. The block 440 produces cardinality estimates which are input to the cost model for all operations in order to compute the cost for the operators. The optimizer 1023 then determines the order to apply these operators for the query plan. The detailed processes for how entropy based information can be used for cardinality estimation are described in FIG. 7, FIG. 8, FIG. 9, FIG. 10 and FIG. 11. The server can also compute or calculate the cost of the query plan at block 460 based on the catalogue data. For example, the server can adjust hot node to increase the cost. Hot node in databases may be an overloaded node or a busy node. The detailed processes for how entropy based information can be used for cost estimation are described in FIG. 13. The optimized 1023 in the server can generate a query plan based on the cardinality estimation (CE) at block 440 and/or cost estimation at block 460.

Figures 5, 6:
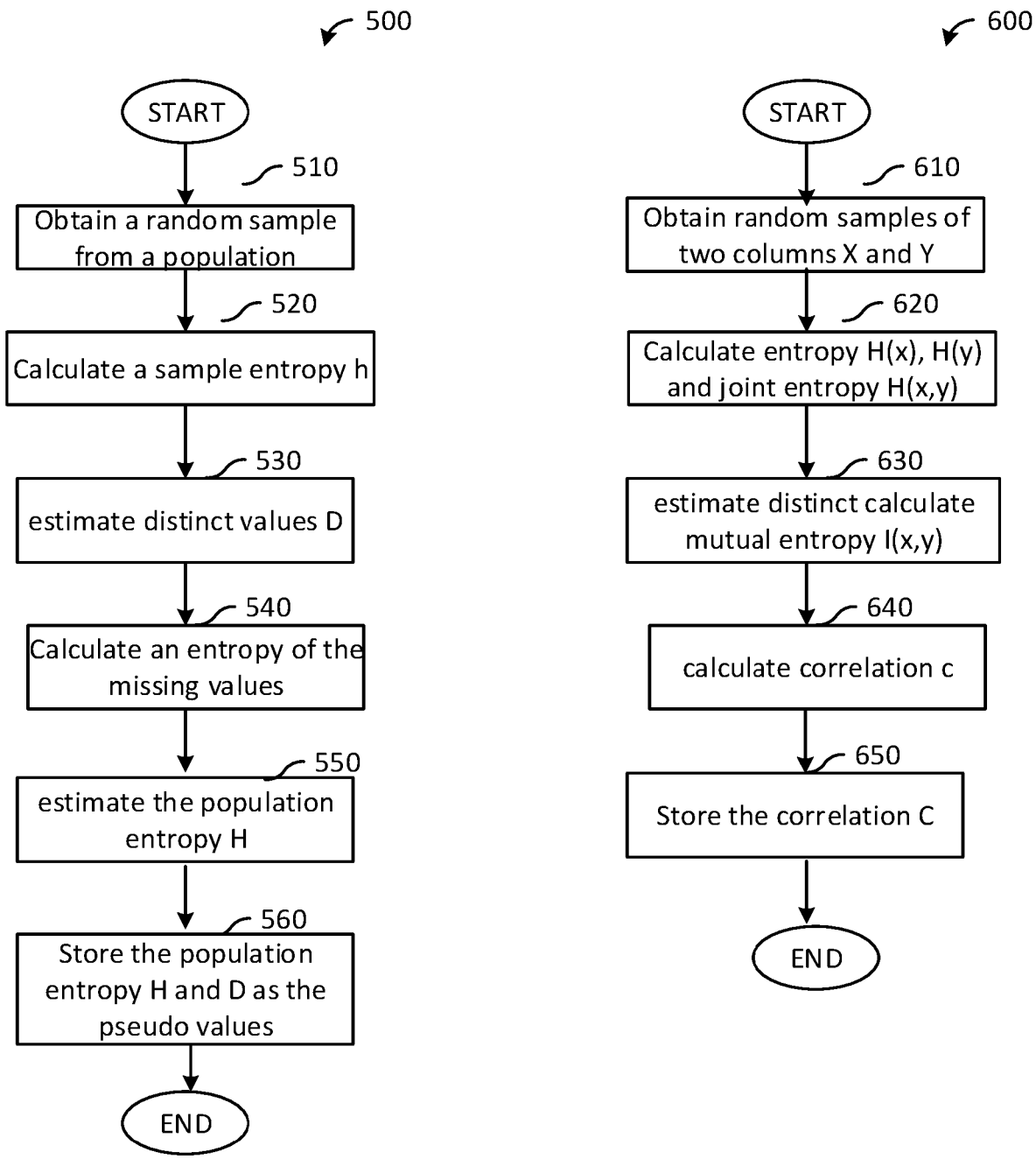
FIG. 5 shows an example process 500 for sample based entropy estimation for a single column.
FIG. 6 is a flow chart illustrating an example process 600 for sample based correlation estimation for two columns X and Y.

FIG. 5 shows an example process 500 for sample based entropy estimation for a single column. The process 500 is executed as part of the statistics collection command from the user if sampling option is used. For some database like PostgreSQL, sampling is the default when collecting statistics. The example process 500 may be implemented as computer instructions stored on computer-readable media (for example, the computer-readable medium) and executable by data processing apparatus (for example, processors) of a database server. In some implementations, the process 500 may be implemented by the optimizer in FIG. 2 and FIG. 4. The example process 500, individual operations of the process 500, or groups of operations may be iterated or performed simultaneously (e.g., using multiple threads). In some cases, the example process 500 may include the same, additional, fewer, or different operations performed in the same or a different order. The process 500 described in FIG. 5 may be called as an extrapolation method or an adaptive method. The process 500 adopts the sampling method described in block 420 of FIG. 4.

Block 510, the database server obtains a random sample from a population. For example, the sampling rate is 2% or higher. The number of values from the random sample is v.

Block 520, according to Eq(1), calculate a sample entropy h for the random sample.

Block 530, estimate distinct values D from sample values v, for example, by using the jackknife estimator method to obtain the distinct values D:

$$D = \frac{v}{1-(1-q)*f_1/r} \qquad \text{Eq (17)}$$

where q is the sampling rate, $f_1$ is the number of values in the sample having a single row, and r is the number of sampled rows. Let p=v/D be the ratio of values found in the samples to values estimated for the population.

Block 540, there are D−v "missing values" not found in the samples. In an example, the entropy of the missing values is approximated by log(D−v) assuming that the missing values are uniformly distributed. This is a reasonable assumption and it gives the maximum entropy from the missing values.

Block 550, the total values are partitioned into those seen and unseen in the samples having values v and D−v, respectively. The population entropy H is then estimated as follows:

In an example, the partition entropy h is used to estimate the population entropy H as Eq(18):

$$p<1 : H=p*h+(1-p)*\log(D-v)-p*\log(p)-(1-p)*\log(1-p) \qquad \text{Eq(18')}$$

$$p=1 : H=h \qquad \text{Eq(18'')}$$

Alternatively, log(D) can be used as the entropy estimation. From experiments, it is found that log(D) works better for low skew cases and Eq(18) works better for high skew cases. In one example, sample skew k=1.25 is selected as a threshold based on experiments. The sample entropy h is used to estimate the population entropy H as follows:

$$k=2^{\log v - h}$$

If $p=1$ then $H=h$ \qquad Eq(19')

Else if $k<1.25$ then $H=\log(D)$ \qquad Eq(19'')

Else $H=p*h+(1-p)*\log(D-v)-p*\log(p)-(1-p)*\log(1-p)$ \qquad Eq(19''')

Eq (19') is for all values exist in the sample. Eq (19'') is for low skew cases. Eq (19''') is for high skew cases.

Note that the skew threshold can be a system parameter which can be tuned based on experiment. The method of using the threshold may be called as an adaptive method, and the one without the threshold may be called as an extrapolation method. The adaptive method provides some improvement over the extrapolation method.

Block 560, the obtained population entropy H is stored in the catalogue. As the Jackknife estimator tends to underestimate the distinct values D when the distribution is skewed, D is actually closer to the pseudo values. Based on this observation, D is stored as the column pseudo values in the catalogue. Because the real distinct values are unknown, the column skew is also unknown.

FIG. 6 shows an example process 600 for sample based entropy and correlation estimation for two columns X and Y. The process 600 is executed as part of the statistics collection command from the user if sampling option is used. For some database like PostgreSQL, sampling is the default when collecting statistics. The example process 600 may be implemented as computer instructions stored on computer-readable media (for example, the computer-readable medium) and executable by data processing apparatus (for example, processors) of a database server. In some implementations, the process 600 may be implemented by the optimizer in FIG. 2 and FIG. 4. The example process 600, individual operations of the process 600, or groups of operations may be iterated or performed simultaneously (e.g., using multiple threads). In some cases, the example process 600 may include the same, additional, fewer, or different operations performed in the same or a different order. The process 600 adopts the sampling method described in block 420 of FIG. 4.

Block 610, database server obtains random samples of two columns X and Y.

For example, the sampling rate is 2% or higher.

Block 620, calculate entropy H(x), H(y) and joint entropy H(x,y), for example, using the example process 500.

Block 630, calculate mutual information I(x,y)=H(x)+H(y)−H(x,y).

Block 640, calculate the degree of correlation c=2^(I(x,y)). Therefore, when the server performs cardinality estimation (CE), the server can consider the degree of correlation c calculated at block 640.

Block 650, the obtained degree of correlation c is stored in the catalogue. The process 600 can extend the joint selectivity to more than two columns.

Figure 7:
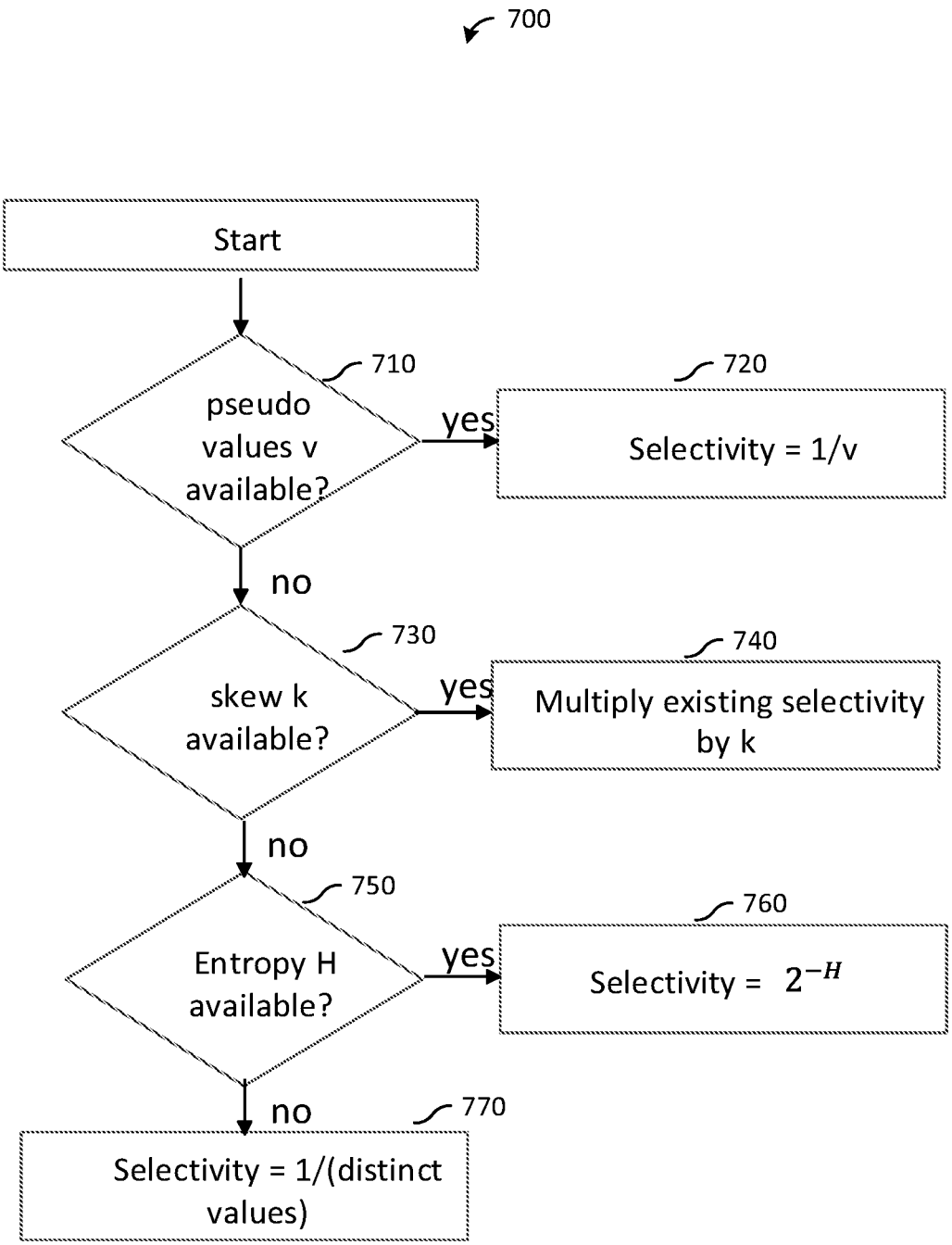
FIG. 7 is a flow chart illustrating an example process 700 how entropy based information can be used for cardinality estimation with single column equality condition.

FIG. 7 describes an example process 700 on how entropy based information can be used for cardinality estimation with single column equality condition. Block 710, the database server determine whether pseudo values v is available. Block 720, if the pseudo values v is available, the selectivity s=1/v. Bock 730, if the pseudo values v is not available, database server determine whether skew k is available. Block 740, if skew k is available, the database server can multiply existing selectivity by k. Bock 750, if skew k is not available, the database server determine whether entropy H is available. Block 760, if entropy H is available, the selectivity $s=2^{-H}$. Bock 770, if entropy H is not available, the selectivity falls back to the conventional s=1/(distinct values).

Figure 8:
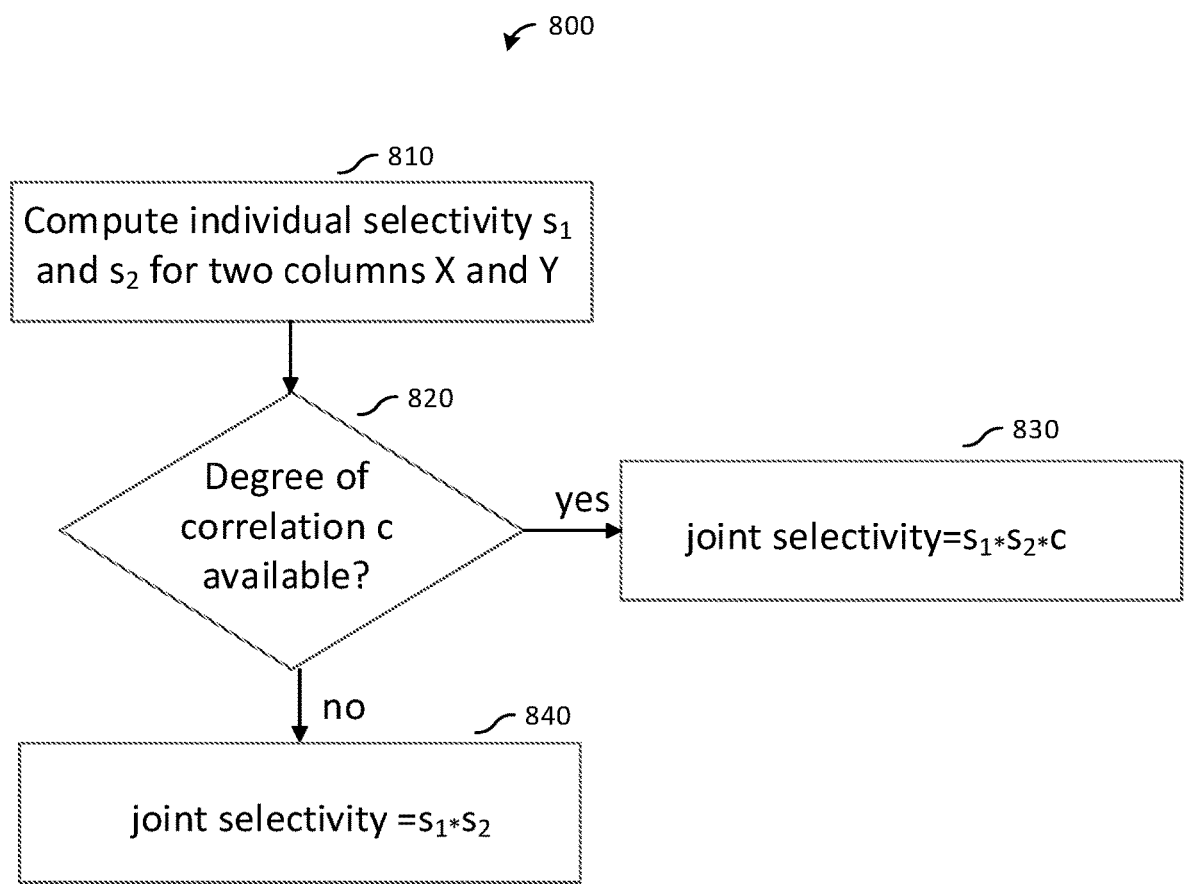
FIG. 8 is a flow chart illustrating an example process 800 how entropy based information can be used for cardinality estimation with equality conditions on two columns.

FIG. 8 describes an example process 800 on how entropy based information can be used for cardinality estimation with equality conditions on two columns X and Y. Block 810, the database server computes individual selectivity $s_1$ for column X, and individual selectivity $s_2$ for column Y, for example, based on process 700. Block 820, the database server determines whether a degree of correlation c of the two columns X and Y is available. Block 830, if the degree of correlation c is available, the joint selectivity is $s(x,y)=s_1*s_2*c$. Bock 840, if the degree of correlation c is not available, the joint selectivity is $s(x,y)=s_1*s_2$.

Figure 9:
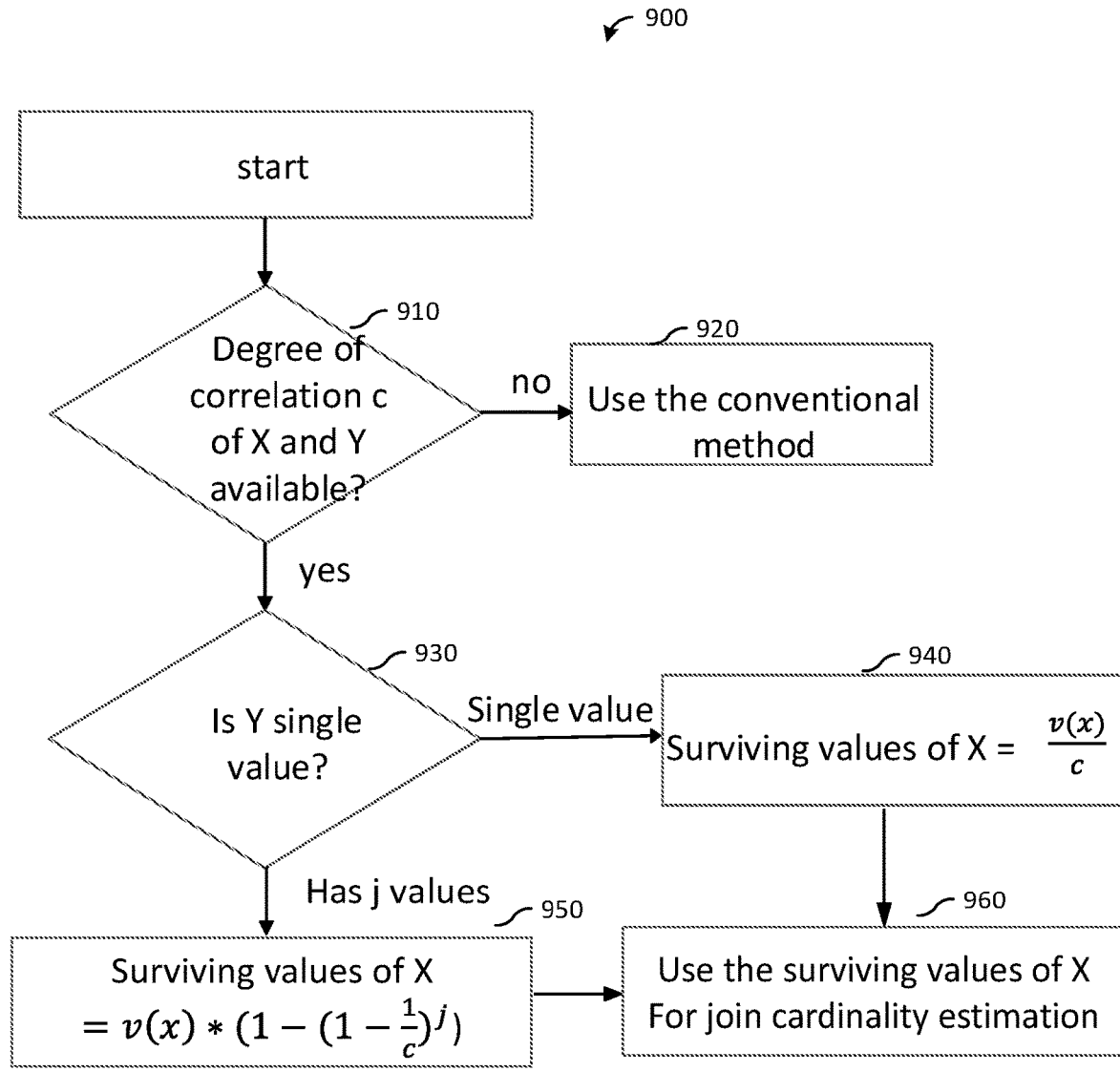
FIG. 9 is a flow chart illustrating an example process 900 how entropy based information can be used for join cardinality estimation with a filtering condition on another column.

FIG. 9 describes an example process 900 on how entropy based information can be used for join cardinality estimation with a filtering condition on another column. Block 910, the database server determines whether a degree of correlation c of the two columns X and Y is available. Block 920, if the degree of correlation c is not available, the database server uses the conventional method to estimate the join cardinality. If the database server determines the degree of correlation c of the two columns X and Y is available, the database server may determine whether column Y is a single value at block 930. Block 940, if column Y is a single value, surviving values (i.e., surviving values) of $$X = \frac{v(x)}{c}.$$

Block 950, if column Y has j values, surviving values (i.e., surviving values) of $$X = v(x)*\left(1-\left(1-\frac{1}{c}\right)\right)^j.$$

Block 960, the server uses the surviving values of X for join cardinality estimation after block 940 or 950.

Figure 10:
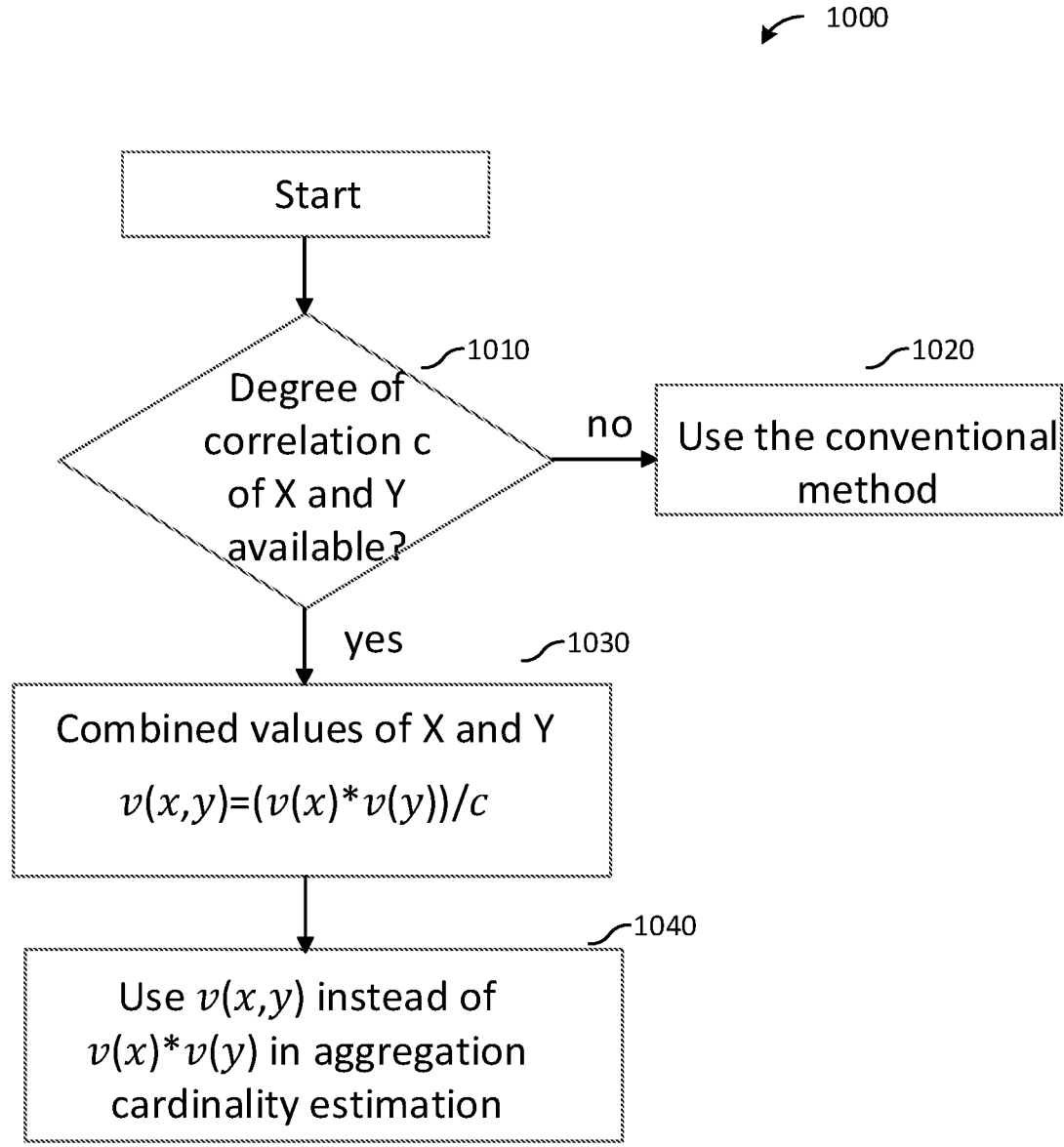
FIG. 10 is a flow chart illustrating an example process 1000 how entropy based information can be used for aggregation cardinality estimation group by two columns.

FIG. 10 describes an example process 1000 on how entropy based information can be used for aggregation cardinality estimation grouped by two columns X and Y. Block 1010, the database server determines whether a degree of correlation c of the two columns X and Y is available. Block 1020, if the degree of correlation c is not available, the database server uses the conventional method to estimate the aggregation cardinality. If the database server determines the degree of correlation c of the two columns X and Y is available, the database server may compute combined values of X and Y, $$v(x, y) = \frac{v(x)*v(y)}{c}$$

at block 1030. Block 1040, the database server uses v(x, y), instead of v(x)*v(y), in aggregation cardinality estimation.

Figure 11:
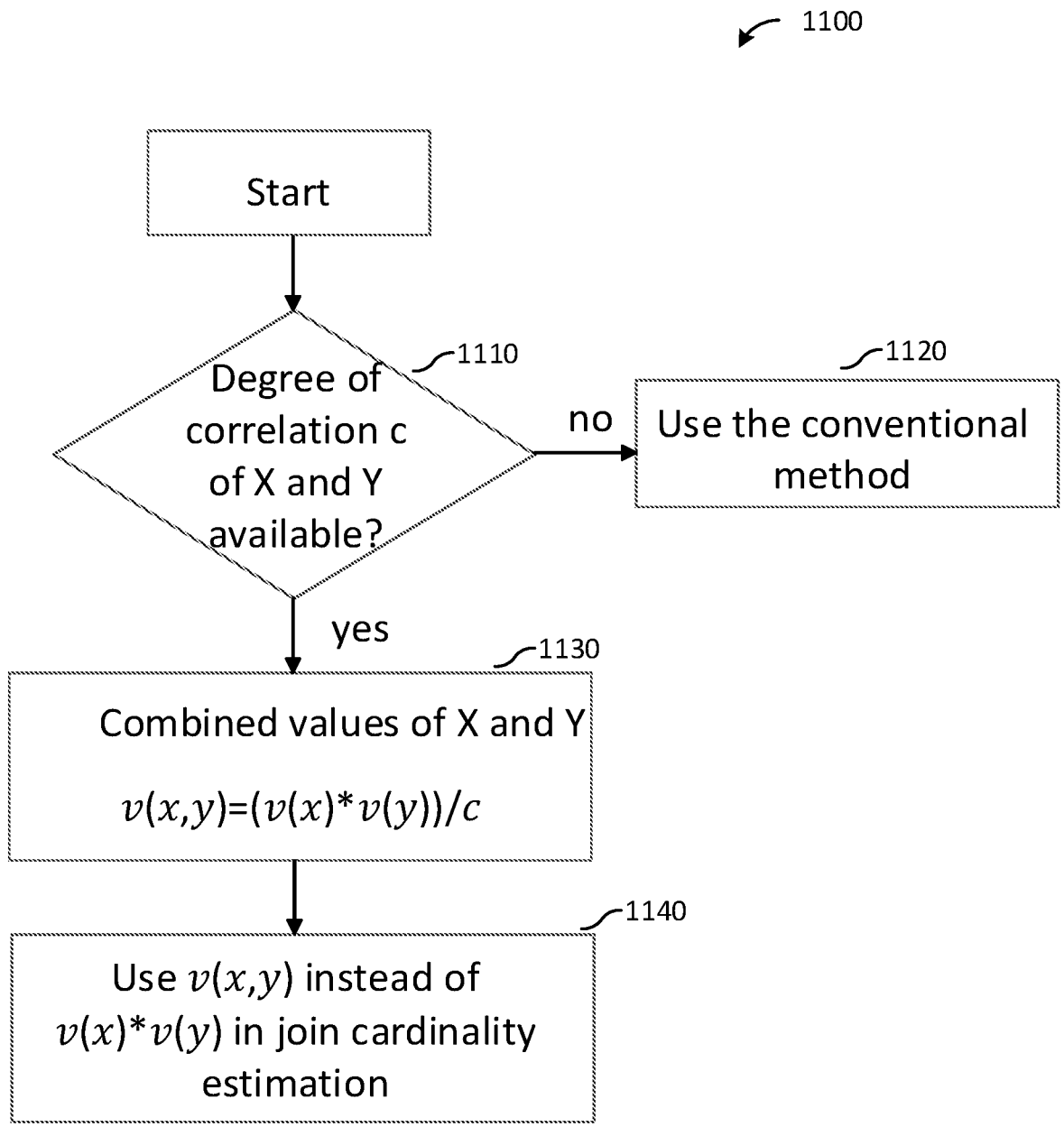
FIG. 11 is a flow chart illustrating an example process 1100 how entropy based information can be used for join cardinality estimation with join conditions on two columns.

FIG. 11 describes an example process 1100 on how entropy based information can be used for join cardinality estimation with join conditions on two columns X and Y. Block 1110, the database server determines whether a degree of correlation c of the two columns X and Y is available. Block 1120, if the degree of correlation c is not available, the database server uses the conventional method to estimate the join cardinality. If the database server determines the degree of correlation c of the two columns X and Y is available, the database server may compute combined values of X and Y, $$v(x, y) = \frac{v(x)*v(y)}{c}$$

at block 1130. Block 1140, the database server uses v(x, y), instead of v(x)*v(y), in join cardinality estimation.

Figure 12A:
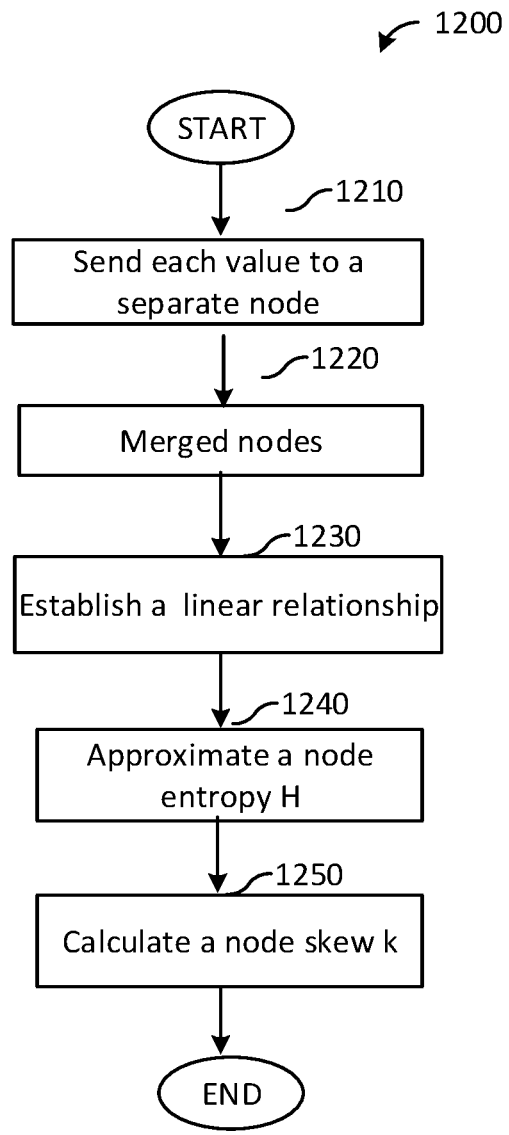
FIG. 12A is a flow chart illustrating an example process 1200 to compute "node skew" from the uneven row distribution on data servers using hashing on a share nothing architecture

FIG. 12A shows an example process 1200 to compute "node skew" from the uneven row distribution on data servers using hashing on a share nothing architecture.

Block 1210, each value is sent to a separate node based on some hashing function. The hashing may be viewed as random.

Block 1220, nodes are randomly merged (e.g., pair-wise) until there are only two left. In this case the rows are observed to be very evenly distributed between the two nodes. The "node entropy" is therefore 1 as there are two nodes (values).

Figure 12B:
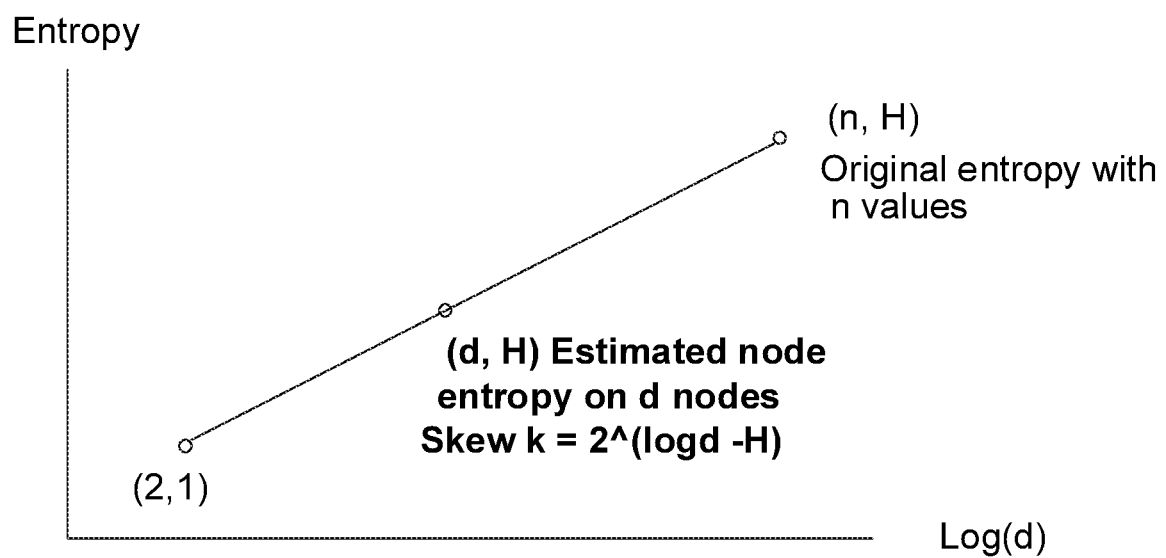
FIG. 12B is a plot showing a linear relationship between the node entropy and log of the number of nodes.

Block 1230, a linear relationship is established between the node entropy and log of the number of nodes. The end points of this line are (H(n), log(n)) and (1, log(2)) because it starts with entropy H(n) having n values (nodes) and ends with entropy 1 having 2 values (nodes). The linear relationship is shown in FIG. 12B.

Block 1240, node entropy H(d) with d nodes can be approximated by interpolation:

$$H(d) = 1 + \frac{(H(n)-1) \times \log\frac{d}{2}}{\log\frac{n}{2}}.$$

Block 1250, Node skew k is calculated as k=2^(log(d)−H(d)).

The process 1200 is a mental process leading to the formula for computing node entropy and node skew. It need not be actually executed. The same model in the process 1200 can be used to estimate the skew of the hash table buckets as well. The node skew model allows the database server to deal with the bottleneck (ie, the hot server) on a share nothing system.

Figure 13:
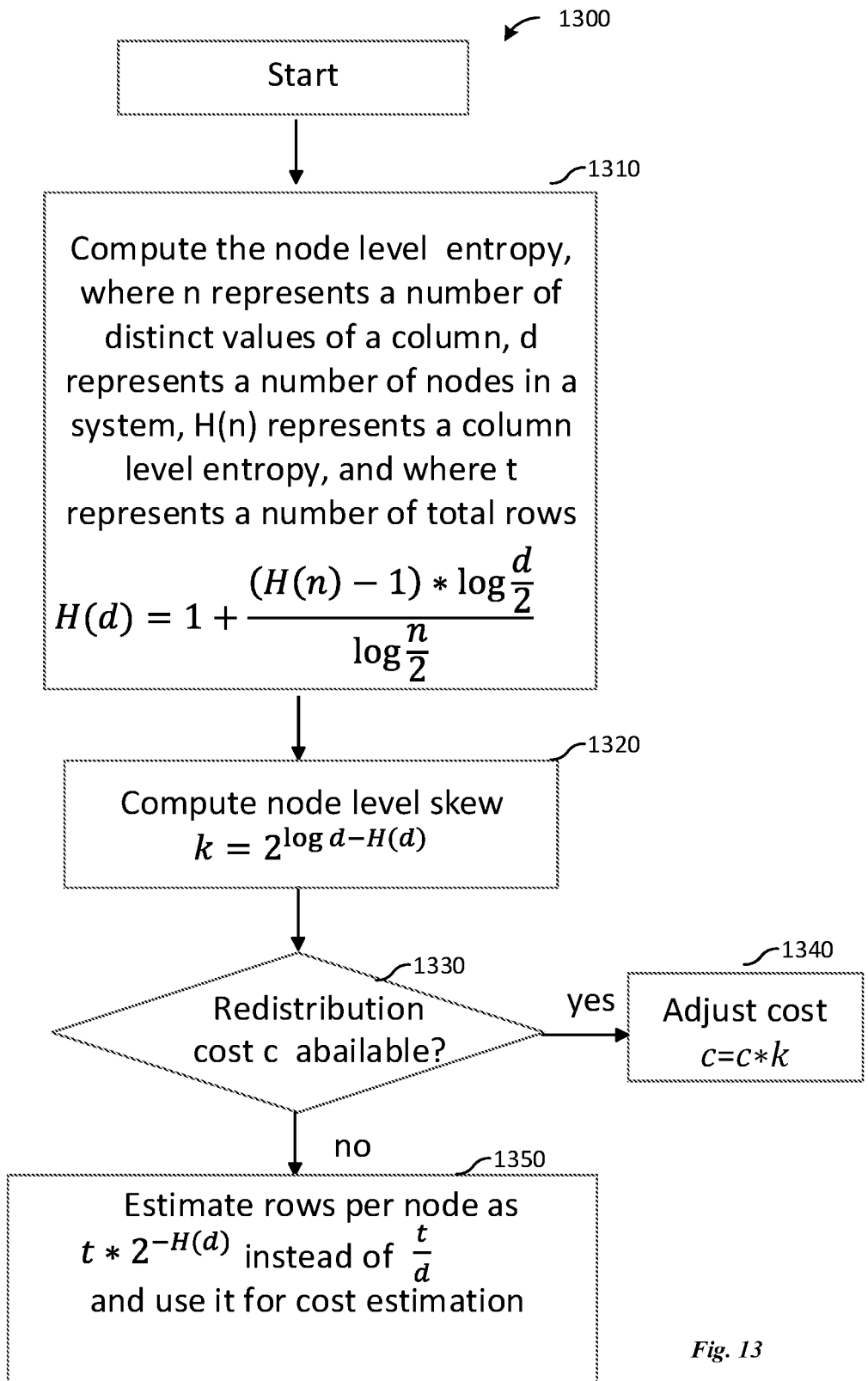
FIG. 13 is a flow chart illustrating an example process 1300 how entropy based information can be used for cost estimation.

FIG. 13 describes an example process 1300 on how entropy based information can be used for cost estimation. Assume that the number of total rows in the table is t, column level entropy is H(n), the column has n distinct values, and the system has d nodes. Block 1310, the database server computers the node level entropy H(d) as below:

$$H(d) = 1 + \frac{(H(n)-1)*\log\frac{d}{2}}{\log\frac{n}{2}}.$$

Block 1320, the database server computers node level skew k as below:

$$k = 2^{\log d - H(d)}$$

Block 1330, the database server determines whether redistribution cost c is available. If redistribution cost c is available, the database server adjusts cost c=c*k at block

1340. If redistribution cost c is not available, the database server estimates rows per node as $t*2^{-H(d)}$ instead of $$\frac{t}{d}$$

and use it for cost estimation at block 1350. Therefore, the database server can use the node level entropy/skew to adjust redistribution cost in order to consider hot node bottleneck.

First experiments (Experiments 1) are conducted to evaluate the accuracy of the estimated entropy from sample. 100,000 values are generated based on gamma distribution (with parameters 2, 2) with various scaling factor to get 14 distributions with skew (as computed by Eq(9)) ranging from 1.42 to 2.97. According to Eq(18) or Eq(19), entropy is estimated from 2% samples. The estimated entropy is compared to the actual, where the error is defined as $$\text{error} = \frac{\text{abs(estimation} - \text{actual})}{\text{actual}} \qquad \text{Eq(20)}$$

The results are shown as table 3. Skew is included in the table to prove that the entropy estimation works well with various skews. The average error is 1.4% for the 14 experiments which are very accurate.

In table 3, for example in the $5^{th}$ row, the number of the total values of the population is 1783. After getting 2% samples from 1783 values, entropy h for the 2% sample is calculated. Then the actual entropy H for the total values is calculated as 9.904826. Skew k for the total values is calculated as 1.859951. Then error for the extrapolation method is calculated based on Eq(20). The result of the error for row $5^{th}$ is 1.502%, which is very small.

TABLE 3

| values | Actual entropy | Actual Skew | Entropy estimation error |
|---|---|---|---|
| 29 | 3.28751 | 2.970017 | 0.007523 |
| 121 | 5.596663 | 2.600472 | 0.001485 |
| 230 | 6.598771 | 2.373012 | 0.001867 |
| 978 | 8.911907 | 2.030428 | 0.016604 |
| 1783 | 9.904826 | 1.859951 | 0.01502 |
| 3262 | 10.889859 | 1.719134 | 0.020911 |
| 5605 | 11.457837 | 1.637106 | 0.020466 |
| 5880 | 11.858924 | 1.583016 | 0.017013 |
| 7106 | 12.17076 | 1.541208 | 0.01874 |
| 8350 | 12.42752 | 1.515759 | 0.007437 |
| 9374 | 12.634067 | 1.47466 | 0.009376 |
| 10620 | 12.81247 | 1.462439 | 0.026994 |
| 11532 | 12.966613 | 1.540673 | 0.02326 |
| 12528 | 13.108872 | 1.418136 | 0.010886 |
| | | AVG = | 0.0140416 |

In addition to the simulations, the algorithms of processes 500 and 600 are implemented on Gauss MPP DBMS and compute entropy for 425 columns from the TPC-DS benchmark, where by default a fixed number of rows (30K) are randomly sampled.

Among the 425 columns, there are some trivial columns having only a single value. From the non-trivial columns, there are 173 columns where not all values are seen in the sample. Overall the process 500 achieves the accuracy with about 3% error which is quite close to the simulation results in table 3.

There are 223 columns where all values are seen in the sample. These columns either have less than 30K rows or are highly non-unique. In this case the average error is 0.13%.

From the first experiments, the entropy estimation based on process 500 is highly accurate in the embodiments described above. Entropy is a key concept and basis for many solutions in the telecommunication areas so the process 500 may be beneficial to these applications as well when computing the exact entropy is costly. After first experiments (Experiments 1) prove the accuracy of the estimated entropy from sample, second experiments (Experiments 2) are conducted to evaluate the accuracy of the estimated single column cardinality.

For a column, 100,000 rows are generated with various distinct values and skew based on two distributions (normal and gamma distributions) with various parameters. As described in process 500, database server samples 2% of the rows, and estimate the entropy based on the adaptive method. The experiments also count the total values n and compute the actual entropy H without sampling. For each test, a row is randomly picked and its value v is obtained. Then all the rows R having the same value is counted. R is then compared to the predictions from three selectivity estimates: (1) $2^{-H}$ using the actual column entropy, (2) $2^{-h}$ using estimated entropy, and (3) conventional $$\frac{1}{n}$$

based on uniform distribution assumption. The estimated rows are estimated rows=(total rows)×selectivity=100000× selectivity The prediction error (columns 3, 4, and 5 in table 4) is the absolute value of the row difference between actual and prediction:

$$\text{error=abs(estimation-actual)} \qquad \text{Eq(21)}$$

The relative error is calculated based on Eq(22):

$$\text{relative error} = \frac{\text{abs(estimation} - \text{actual})}{\text{actual}} \qquad \text{Eq(22)}$$

The test is repeated 100 times and the average error is computed (where $e_i$ are individual errors):

$$avg = \frac{e_1 + e_2 + \ldots e_{100}}{100}$$

The geomean of the errors is also computed as:

$$geomean = \sqrt[100]{e_1 \times e_2 \times \ldots e_{100}}$$

Geomean is a better metric than the regular average when the individual numbers have different scales. The results are shown in table 4 (for normal distributions) and table 5 (for gamma distributions).

Table 4 describes the results from 8 normal distributions. In general, the errors are higher with higher skew. On the average, the sample based entropy prediction (columns 4 and 7) improves the cardinality estimation error from 129 to 82 rows (or 42 to 27 using geometric mean) as compared to the uniform prediction (columns 5 and 8). Percentage wise, the entropy based estimation improves cardinality estimation error from 49% to 33%.

In table 4, for example in the 3$^{rd}$ row, the number of the total values of the population is 1369, and skew k for the total values is calculated as 1.673. The three selectivity estimates have errors 43.6, 42.6, and 63.6. Percentage wise the errors are 35.23%, 34.45%, and 53.18%. The errors from the entropy based methods are much lower than the ones from traditional methods.

TABLE 4

| values | Actual skew | entropy error | sample error | uniform error | Relative entropy error | Relative sample error | Relative uniform error |
|---|---|---|---|---|---|---|---|
| 164 | 1.975 | 424.8 | 373.2 | 568.2 | 0.3934 | 0.3456 | 0.5262 |
| 307 | 1.858 | 188.4 | 182.2 | 312.6 | 0.3757 | 0.3634 | 0.6234 |
| 1369 | 1.673 | 43.6 | 42.6 | 63.6 | 0.3523 | 0.3445 | 0.5138 |
| 2660 | 1.578 | 22.0 | 21.5 | 32.0 | 0.3414 | 0.3340 | 0.4960 |
| 2559 | 1.571 | 22.2 | 22.7 | 24.1 | 0.4190 | 0.4288 | 0.4542 |
| 4741 | 1.477 | 11.9 | 9.4 | 15.0 | 0.3630 | 0.2812 | 0.4471 |
| 5767 | 1.449 | 8.3 | 7.8 | 11.9 | 0.3001 | 0.2796 | 0.4294 |
| 10610 | 1.361 | 3.6 | 3.8 | 5.7 | 0.2857 | 0.2991 | 0.4610 |
| AVG= | | 89.3 | 81.9 | 129.1 | 0.3424 | 0.3274 | 0.4936 |
| Geomean= | | 28.7 | 27.4 | 41.5 | 0.3387 | 0.3241 | 0.4902 |

In general, cardinality under-estimation is worse than over-estimation as the optimizer tends to choose a very aggressive plan when cardinality estimation is low. For example, the optimizer may choose to duplicate (i.e., broadcast) a small table (based on estimation) to join with a big table. If the cardinality estimation is way off and the small table turns out to be a large one, the chosen plan will perform very poorly. However, the entropy based cardinality estimation method is always an over-estimation as compared to the conventional uniform method so it is a safer method in addition to being a more accurate one.

Table 5 describes the results from 8 gamma distributions with higher skew. The average cardinality estimation error is improved from 134 to 91 rows (or 59 to 38 using Geomean). In table 5, for example in the 4$^{th}$ row, the number of the total values of the population is 1782. Skew k for the total values is calculated as 1.861. The three selectivity estimates have errors 41.1, 41.1, and 67.1. Percentage wise the errors are 35.29%, 35.33%, and 57.71%. The errors from the entropy based methods are much lower than the ones from traditional methods.

TABLE 5

| values | skew | entropy error | sample error | uniform error | Relative entropy error | Relative sample error | Relative uniform error |
|---|---|---|---|---|---|---|---|
| 406 | 2.993 | 376.5 | 381.7 | 498.5 | 0.5080 | 0.5150 | 0.6725 |
| 974 | 2.020 | 84.4 | 77.8 | 127.9 | 0.3875 | 0.3568 | 0.5869 |
| 746 | 2.754 | 174.6 | 157.8 | 275.6 | 0.4417 | 0.3993 | 0.6973 |
| 1782 | 1.861 | 41.1 | 41.1 | 67.1 | 0.3529 | 0.3533 | 0.5771 |
| 2919 | 2.198 | 36.1 | 37.3 | 47.2 | 0.4466 | 0.4617 | 0.5845 |
| 7116 | 1.546 | 6.9 | 6.7 | 11.3 | 0.3018 | 0.2957 | 0.4948 |
| 4370 | 2.066 | 25.9 | 23.9 | 35.1 | 0.4741 | 0.4362 | 0.6413 |
| 10490 | 1.459 | 4.4 | 3.7 | 6.7 | 0.2849 | 0.2437 | 0.4394 |
| AVG= | | 93.7 | 91.3 | 133.7 | 0.3997 | 0.3827 | 0.5867 |
| Geomean= | | 39.9 | 38.0 | 59.1 | 0.3921 | 0.3732 | 0.5808 |

Third experiments (experiments 3) are conducted to verify that correlation estimates from sample are accurate and the resulting joint cardinality estimates are greatly improved with correlation. The experiments results are listed in the table 6 and table 7. Distinct values for each column (X and Y) and joint values for the two columns (XY) are listed in table 6. The corresponding skews are also listed. The rows are separated in two groups: first group for the "modulo correlation" and the 2nd for the "noise correlation." From table 6, the correlation estimation from sample is very accurate: the average error for the modulo correlation is less than 1% and for the noise correlation it is 5% with the biggest error about 7%.

TABLE 6

| x values | y values | xy values | x skew | y skew | xy skew | Actual degree of correlation | degree of correlation estimation error |
|---|---|---|---|---|---|---|---|
| 720 | 30 | 720 | 1.751 | 1.000 | 1.751 | 30.00 | 0.0044 |
| 1345 | 30 | 1345 | 1.648 | 1.000 | 1.648 | 29.99 | 0.0060 |
| 1969 | 30 | 1969 | 1.603 | 1.000 | 1.603 | 30.00 | 0.0062 |
| 2545 | 30 | 2545 | 1.565 | 1.000 | 1.565 | 30.00 | 0.0076 |
| 3112 | 30 | 3112 | 1.536 | 1.000 | 1.536 | 30.00 | 0.0052 |
| | | | | | | AVG= | 0.0059 |
| | | | | | | Geomean= | 0.0058 |
| 83 | 86 | 921 | 2.007 | 2.039 | 2.691 | 5.10 | 0.0333 |
| 165 | 166 | 1662 | 1.988 | 1.990 | 2.520 | 10.08 | 0.0476 |
| 233 | 236 | 2338 | 1.881 | 1.901 | 2.296 | 15.10 | 0.0708 |
| 304 | 307 | 2962 | 1.843 | 1.859 | 2.193 | 20.16 | 0.0355 |
| 381 | 379 | 3571 | 1.849 | 1.838 | 2.119 | 25.22 | 0.0473 |
| | | | | | | AVG= | 0.0469 |
| | | | | | | Geomean= | 0.0452 |

The cardinality estimation errors are listed in table 7. The errors from the conventional method (i.e. assuming uniform distribution with no correlation) are very bad, all exceeding 90%. The conventional method suffers from two problems: ignoring skew and ignoring correlation. Take the 1st row in table 6 as an example. The degree of correlation is 30 and the joint skew is 1.75 so the under-estimation from the conventional method is about a factor of 30*1.75=52.5. The predicted rows (see the 1$^{st}$ row in table 7) are 242.1 and 4.6 with a ratio of 52.6, close to 52.5. Overall, the entropy based methods are able to greatly improve the cardinality estimation, from an average error of 96% to 35% for the modulo correlation cases and from 95% to 53% for the noise correlation cases.

The modulo correlation is not uncommon. For example, the date dimension table in the TPC-DS benchmark has a date column with 73K values and a year column with 200 values. The degree of correlation between date and year columns is 200 based on the correlation definition. According to the surviving value algorithm, the dates per year is $$\frac{v(\text{date})}{c} = \frac{73000}{200} = 365$$

which says there are 365 dates in a year, as expected. The good thing about the correlation model is that there is no need for human knowledge about dates and year. The model will capture this relationship automatically. Theoretically the date column functionally determines year column, just like the examples where column X determines Y for the 1st 5 rows in table 6. Note that X and XY have the same distinct values. Functional dependency is the worst case for joint cardinality estimation as one of the conditions should be completely ignored. That is, if there are conditions on columns X and Y then the condition on Y should be ignored.

The correlation model described in the process 600 captures this relationship automatically.

TABLE 7

| sample predicted rows | uniform predicted rows | sample error | uniform error | sample error | uniform error |
|---|---|---|---|---|---|
| 242.1 | 4.6 | 109.7 | 278.4 | 0.3649 | 0.9720 |
| 121.8 | 2.5 | 58.3 | 153.2 | 0.3473 | 0.9729 |
| 80.9 | 1.7 | 36.0 | 97.4 | 0.3355 | 0.9690 |
| 61.0 | 1.3 | 28.2 | 73.7 | 0.3457 | 0.9573 |
| 49.1 | 1.1 | 21.6 | 55.8 | 0.3324 | 0.9412 |
| | AVG= | 50.8 | 131.7 | 0.3452 | 0.9625 |
| | Geomean= | 42.6 | 111.3 | 0.3550 | 0.9624 |
| 301.9 | 14.0 | 226.5 | 418.5 | 0.5495 | 0.9442 |
| 152.5 | 3.7 | 103.8 | 210.8 | 0.4124 | 0.9693 |
| 105.2 | 1.8 | 67.1 | 127.2 | 0.5193 | 0.9285 |
| 71.4 | 1.1 | 56.7 | 92.6 | 0.6743 | 0.9340 |
| 56.5 | 1.0 | 40.6 | 75.5 | 0.4934 | 0.9675 |
| | AVG= | 98.9 | 184.9 | 0.5298 | 0.9487 |
| | Geomean= | 81.7 | 151.0 | 0.5230 | 0.9485 |

The disclosure illustrates some examples related to Transaction Processing Council (TPC) Benchmark Decision Support (DS) (TPC-DS). First example is for TPC-DS skew. The item table includes a column named as i_manufact_id. For example, the number of actual rows with condition i_manufact_id=649 is 340. Without considering the skew, the number of estimated rows under column i_manufact_id is 262. The error rate is: (340−262)/340=23%. With considering skew, the number of estimated rows under column i_manufact_id is 324. The error rate is: (340−324)/340=4.7%. Therefore, with considering skew, the error rate is reduced to 4.7% from 23%.

Second example is for TPC-DS correlation. The item table includes a column named as i_class and another column named as i_category. For example, the number of actual rows under conditions i_class='consignment' and i_category='jewelry' is 1884. Without considering a degree of correlation of the two columns i_class and i_category, the number of estimated rows under the two columns is 186. The error rate is: (1884−186)/1884=90%. With considering the degree of correlation of the two columns, the number of estimated rows under the two columns is 1835. The error rate is: (1884−1835)/1884=2.6%. Therefore, with considering the degree of correlation of the two columns, the error rate is reduced to 2.6% from 90%.

Third example is for TPC-DS two join conditions. For example, the two join conditions are ss_ticket_number=sr_ticket_number and ss_item_sk=sr_item_sk. The number of actual rows under the two join conditions is 287999764. Without considering a degree of correlation of the two join conditions, the number of estimated rows is 11998. The error rate is: (287999764−11998)/287999764=99%. With considering the degree of correlation of the two join conditions, the number of estimated rows under the two columns is 287948808. The error rate is: (287999764−287948808)/287999764=0.02%. Therefore, with considering the degree of correlation of the two columns, the error rate is reduced to 0.02% from 99%.

Fourth example is for TPC-DS group key. For example, the table is grouped by ca_county and ca_state. The number of actual rows under the two groups is 5006. Without considering a degree of correlation of the two groups, the number of estimated rows is 94140. The error rate is: (94140−5006)/5006=1780%. With considering the degree of correlation of the two join conditions, the number of estimated rows under the two columns is 6714. The error rate is: (6714−5006)/5006=34%. Therefore, with considering the degree of correlation of the two columns, the error rate is reduced to 34% from 1780%.

Fifth example is query 24 (Q24) in TPC-DS:
select * from store_sales, store_returns, store
where ss_ticket_number=sr_ticket_number
and ss_item_sk=sr_item_sk
and ss_store_sk=store.s_store_sk.

Without considering correlation, the join cardinality is hugely under-estimated. A large table is incorrectly estimated as a small one and is used to build the hash table for a hash join. This wrong decision causes a bad plan to be generated and executed. With considering correlation, the estimation is much improved and the wrong decision is corrected. This results in a good plan which is up to 5 times faster than the bad plan.

Sixth example is under TPC-DS 1000x, on row store and column store with 3 machines and 18 data nodes. It is demonstrated that Q64 and Q85 are improved by more than 20% by adjusting cardinality estimation with skew and correlation.

Figure 14:
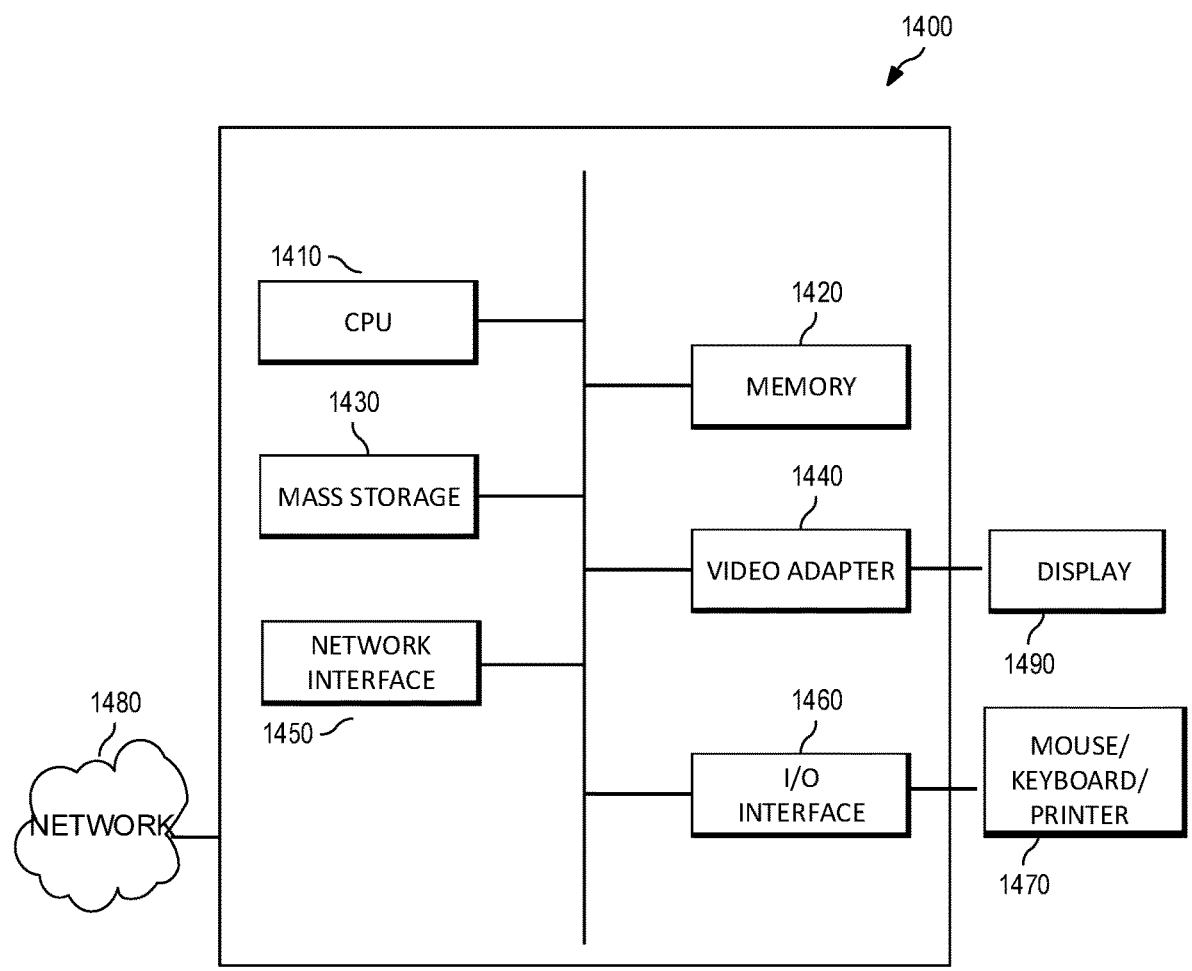
FIG. 14 is a block diagram of a database server 1400 that can be used to implement various embodiments.

FIG. 14 is a block diagram of a database server 1400 that can be used to implement various embodiments. Additionally, the database server 1400 can host one or more of the described elements. In some embodiments, the database server 1400 is equipped with one or more input/output devices, such as a speaker, microphone, mouse, touchscreen, keypad, keyboard, printer, display, and the like. The database server 1400 may include one or more central processing unit (CPU) 1410, a memory 1420, a mass storage 1430, a video adapter 1440, and an I/O interface 1460 connected to a bus. The bus is one or more of any type of several bus architectures including a memory bus or memory controller, a peripheral bus, a video bus, or the like.

The CPU 1410 may have any type of electronic data processor. The memory 1420 may have, or be, any type of system memory such as static random access memory (SRAM), dynamic random access memory (DRAM), synchronous DRAM (SDRAM), read-only memory (ROM), a combination thereof, or the like. In an embodiment, the memory 1420 may include ROM for use at boot-up, and DRAM for program and data storage for use while executing programs. In embodiments, the memory 1420 is non-transitory. The mass storage 1430 includes any type of storage device that stores data, programs, and other information and to make the data, programs, and other information accessible via the bus. The mass storage 1430 includes, for example, one or more of a solid state drive, hard disk drive, a magnetic disk drive, an optical disk drive, or the like.

The video adapter 1440 and the I/O interface 1460 provide interfaces to couple external input and output devices to the database server 1400. For example, the database server 1400 may provide SQL command interface to clients. As illustrated, examples of input and output devices include a display 1490 coupled to the video adapter 1440 and any combination of mouse/keyboard/printer 1470 coupled to the I/O interface 1460. Other devices may be coupled to the database server 1400, and additional or fewer interface cards may be utilized. For example, a serial interface card (not shown) may be used to provide a serial interface for a printer.

The database server 1400 also includes one or more network interfaces 1450, which includes wired links, such as an Ethernet cable or the like, and/or wireless links to access nodes or one or more networks 1480. The network interface 1450 allows the database server 1400 to communicate with remote units via the networks 1480. For example, the network interface 1450 may provide communication to database. In an embodiment, the database server 1400 is coupled to a local-area network or a wide-area network for data processing and communications with remote devices, such as other processing units, the Internet, remote storage facilities, or the like.

As a result, the database server and the methods, by defining skew and correlation based on entropy and developing algorithms to compute and use them, are provided to improve CE in query optimization of the database management system. Additionally, CE, which is the most critical component in a cost based query optimizer, can be significantly improved for highly skewed or correlated data. The skew and correlation based on entropy and developed algorithms can be applied to all areas in CE including single table selectivity, join selectivity with and without filtering conditions, and grouping by values in aggregation. By calculating a data skew for a column based on an entropy for the column in a database, storing the data skew to a catalogue in the database, estimating a selectivity for the column by multiplying a first selectivity with the data skew, cardinality estimation in the database management system is improved. By calculating a degree of correlation for two columns in a database, storing the degree of correlation to a catalogue in the database, estimating a selectivity taking into account the degree of correlation, cardinality estimation in the database management system is improved. The improved cardinality estimates in turn improve the query plan generated by the optimizer which leads to better query performance.

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

The operations described in this disclosure may be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, for example, an FPGA (field programmable gate array) or an ASIC (application-specific integrated circuit). The apparatus may also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

To provide for interaction with a user, implementations of the subject matter described in this disclosure may be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user may provide input to the computer. Other kinds of devices may be used to provide for interaction with a user as well; for example, feedback provided to the user may be any form of sensory feedback, for example, visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A server applied to a database management system, comprising:
   a non-transitory memory storage comprising instructions; and
   one or more processors in communication with the memory, wherein the one or more processors executes the instructions to:
   calculate a data skew for a first column in a database based on an entropy for the first column, wherein the first column includes a plurality of distinct values;
   store the data skew to a catalogue in the database;
   estimate a selectivity for the first column by multiplying a first selectivity with the data skew; and
   generate a query plan based on the estimated selectivity.

2. The server of claim 1, wherein the one or more processors further executes the instructions to:
   calculate a joint entropy for the first column and a second column in the database;
   calculate mutual information I based on the entropy for the first column, an entropy for the second column, and the joint entropy;
   calculate a degree of correlation c between the first and second columns based on the mutual information, wherein $c=2^I$; and
   store the degree of correlation in the catalogue.

3. The server of claim 2, wherein the one or more processors further executes the instructions to:
   estimate a joint selectivity between the first and second columns by multiplying the selectivity for the first column, a selectivity for the second column, and the degree of correlation; and
   generate the query plan based on the estimated joint selectivity.

4. The server of claim 2, wherein the one or more processors further executes the instructions to:
   calculate a number of surviving values of the first column given a condition on the second column, according to the degree of correlation and a number of selected distinct values of the second column; and
   use the number of surviving values of the first column for join cardinality estimation.

5. The server of claim 4, wherein the number of distinct values of the second column is 1, and wherein the one or more processors executes the instructions to:
   calculate the number of surviving values of the first column by dividing a first number of pseudo values of the first column with the degree of correlation, wherein the first column has entropy H and the first number of pseudo values of the first column is $2^H$.

6. The server of claim 4, wherein j represents the number of distinct values of the second column, v1(x) represents a first number of pseudo values of the first column, and c represents the degree of correlation, wherein the one or more processors executes the instructions to:
   calculate v(x) where v(x) is the number of surviving values of the first column, as: $v(x)=v1(x)*(1-1/c)^j$.

7. The server of claim 2, wherein the one or more processors further executes the instructions to:
- calculate a number of combined values of the first column and the second column by dividing a product of a number of pseudo values of the first column and a number of pseudo values of the second column with the degree of correlation; and
- use the number of combined values for aggregation cardinality estimation.

8. The server of claim 1, wherein the one or more processors executes the instructions to:
- obtain a sample from the first column;
- calculate a sample entropy h for the sample;
- estimate a number of distinct values of the first column;
- calculate entropy H for the first column based on the sample entropy h; and
- store the entropy H in the catalogue.

9. The server of claim 8, wherein v represents a number of distinct values of the sample, and D represents an estimated number of distinct values of the first column, and p represents a ratio of values found in the sample to values estimated for the first column, and wherein the one or more processors executes the instructions to estimate the entropy H as:
- If p=1 then H=h;
- Else H=p*h+(1−p)*log 2(D−v)−p*log 2(p)−(1−p)*log 2(1−p), wherein p=v/D.

10. The server of claim 8, wherein v represents a number of distinct values of the sample, D represents an estimated number of distinct values of the first column, p represents a ratio of values found in the sample to values estimated for the first column, and k represents sample skew, wherein the one or more processors executes the instructions to estimate the entropy H as:
- If p=1 then H=h;
- Else if k<1.25 then H=log(D);
- Else H=p*h+(1−p)*log(D−v)−p*log(p)—(1−p)*log(1−p).

11. The server of claim 8, wherein the one or more processors executes the instructions to:
- calculate sample skew k for the first column as $k=2^{\log v-h}$;
- wherein v represents a number of distinct values of the sample.

12. A server applied to a database management system which comprises multiple nodes, comprising:
- a non-transitory memory storage comprising instructions; and
- one or more processors in communication with the memory, wherein the one or more processors executes the instructions to:
- calculate a node level entropy;
- calculate a node level skew based on the node level entropy;
- determine whether a redistribution cost is available; and
- multiply the redistribution cost with the node level skew for cost estimation.

13. The server of claim 12, wherein H(n) represents a column level entropy, n represents a number of distinct values of the column, and d represents a number of the multiple nodes, wherein the one or more processors executes the instructions to:
- calculate the node level entropy H(d) as: H(d)=1+(H(n)−1)*log(d/2)/log(n/2).

14. The server of claim 2, wherein the one or more processors further executes the instructions to:
- calculate a number of combined values of the first column and the second column by dividing a product of a number of pseudo values of the first column and a number of pseudo values of the second column with the degree of correlation; and
- use the number of the combined values for join cardinality estimation.

15. The server of claim 13, wherein the one or more processors executes the instructions to:
- calculate node level skew k as: $k=2^{\log d-H(d)}$.

16. A method applied to a database management system, comprising:
- calculating, by a server in the database management system, a data skew for a first column in a database based on an entropy for the first column, wherein the first column includes a plurality of distinct values;
- storing, by the server, the data skew to a catalogue in the database;
- estimating, by the server, a selectivity for the first column by multiplying a first selectivity with the data skew; and
- generating, by the server, a query plan based on the estimated selectivity.

17. The method of claim 16, wherein the method further comprises:
- calculating, by the server, a joint entropy for the first column and a second column in the database;
- calculating, by the server, mutual information I based on the entropy for the first column, an entropy for the second column, and the joint entropy;
- calculating, by the server, a degree of correlation c between the first and second columns based on the mutual information, wherein $c=2^I$; and
- storing, by the server, the degree of correlation in the catalogue.

18. The method of claim 17, wherein the method further comprises:
- estimating, by the server, a joint selectivity between the first and second columns by multiplying the selectivity for the first column, a selectivity for the second column, and the degree of correlation; and
- generating, by the server, the query plan based on the estimated joint selectivity.

19. The method of claim 16, wherein the method further comprises:
- obtaining, by the server, a sample from the first column;
- calculating, by the server, a sample entropy for the sample;
- calculating, by the server, entropy H for the first column based on the sample entropy; and
- storing, by the server, the entropy H in the catalogue.

20. The method of claim 19, wherein the method comprises:
- calculating sample skew k for the first column as $k=2^{\log v-h}$;
- wherein v represents a number of distinct values of the sample.

* * * * *

UNITED STATES PATENT AND TRADEMARK OFFICE
CERTIFICATE OF CORRECTION

PATENT NO. : 10,664,477 B2
APPLICATION NO. : 15/850361
DATED : May 26, 2020
INVENTOR(S) : Kuorong Chiang Page 1 of 1

It is certified that error appears in the above-identified patent and that said Letters Patent is hereby corrected as shown below:

On the Title Page

In item (73), in "Assignee", in Column 1, Line 1, delete "Plana," and insert --Plano,-- therefor Signed and Sealed this
Twenty-fifth Day of August, 2020

Andrei Iancu
*Director of the United States Patent and Trademark Office*